United States Patent [19]  
Herzog et al.

[11] Patent Number: 4,651,278  
[45] Date of Patent: Mar. 17, 1987

[54] INTERFACE PROCESS FOR AN ALL POINTS ADDRESSABLE PRINTER

[75] Inventors: Alexander Herzog, Boulder; James W. Marlin, Longmont; Brian G. Platte; Filip J. Yeskel, both of Boulder, all of Colo.

[73] Assignee: International Business Machines Corporation, Armonk, N.Y.

[21] Appl. No.: 700,427

[22] Filed: Feb. 11, 1985

[51] Int. Cl.⁴ .............................................. G06F 3/12
[52] U.S. Cl. ..................................... 364/300; 364/900
[58] Field of Search ............... 364/300, 200 MS File, 364/900 MS File

[56] References Cited

U.S. PATENT DOCUMENTS 4,539,653  9/1985  Bartlett et al. ..................... 364/900

Primary Examiner—Raulfe B. Zache
Attorney, Agent, or Firm—Charles E. Rohrer

[57] ABSTRACT

This invention is a process for interconnecting an all points addressable printer with a host application program wherein the application presents output to be printed to the printer and wherein the host application can be present on a variety of different computer equipment such as a large host computer, a standalone workstation, or workstation on a local area network and wherein the all points addressable page printer can utilize any type of printing technology such as electrophotographic, magnetic or other and wherein the printer and the application host are interconnected by communicating means such as a channel, local area network, or telecommunication line and wherein any type of transmission protocol can be used and wherein the process enables the transmission of commands and data from the host application to the printer in a manner which is independent of the communication means and transmission protocol. And, finally, wherein the process enables the transmission of a variety of types of data including text, graphics, image, or bar code which may be merged together on a single printed page.

54 Claims, 9 Drawing Figures

FIG. 6A

| CONTROL (MNEMONIC) | TYPE | COUNT | RANGE | REQD | NOTES |
|---|---|---|---|---|---|
| ABSOLUTE MOVE INLINE (AMI) | X'C6' | 4 | 0-32K | DEV LIMIT | |
| RELATIVE MOVE INLINE (RMI) | X'C8' | 4 | ± 32K | DEV LIMIT | |
| SET INLINE MARGIN (SIM) | X'C0' | 4 | 0-32K, X'FFFF' | DEV LIMIT X'FFFF' | → USE LP |
| SET INTER-CHARACTER INCR. (SII) | X'C2' | 4 | 0-255, X'FFFF' | 0-255, X'FFFF' | → USE LPD |
| SET VARIABLE SPACE INCR. (VSI) | X'C4' | 4 | 0-32K | DEV LIMIT | |
| ABSOLUTE MOVE BASELINE (AMB) | X'D2' | 4 | 0-32K | DEV LIMIT | |
| RELATIVE MOVE BASELINE (RMB) | X'D4' | 4 | ± 32K | 0-32767 | |
| SET BASELINE INCR. (SBI) | X'D0' | 4 | 0-32K, X'FFFF' | DEV LIMIT X'FFFF' | → USE LPD |
| BEGIN LINE (BLN) | X'D8' | 2 | NONE | NONE | |
| SET CODED FONT LOCAL (SCFL) | X'F0' | 3 | 0-127, X'FF' | 1, X'FF' | 1=CP256 → USE LPD |
| DRAW I-AXIS RULE (DIR) | X'E4' | 4 OR 5 | ± 32K | ± I LIMIT | I LENGTH |
| | | | ± 32K | +1 | WIDTH |
| DRAW B-AXIS RULE (DBR) | X'E6' | 4 OR 5 | ± 32K | + B LIMIT | B LENGTH |
| | | | ± 32K | +1 | WIDTH |

NOTES: (1) ADD ONE TO 'TYPE' VALUE TO CAUSE CHAINING.
(2) "0-32K" MEANS 0 TO +32,767.
"± 32K" MEANS -32,768 TO +32,767.

FIG. 6B

| CONTROL (MNEMONIC) | TYPE | COUNT | RANGE | REQD | NOTES |
|---|---|---|---|---|---|
| SET CHAR ROTATION (SCR) | X'7C' | 4 | X'0000'<br>X'2D00'<br>X'5A00'<br>X'8700' | X'0000' | 0<br>90 DEG.<br>180 DEG.<br>270 DEG. |
| NO OPERATION (NOP) | X'F8' | 2-225 | ANY VALUE | ANY VALUE | IGNORED |
| TRANSPARENT DATA (TRN) | X'DA' | 2-225 | 1-253 BYTES | 1-253 BYTES | DATA |
| TEXT COLOR | X'74' | 4-5 | X'0000'-<br>X'000F'&<br>X'FF00'-<br>X'FF08' | DEFAULT COLOR | |
| BEGIN OVERSTRIKE (BOS) | X'72' | TBD | TBD | TBD | |
| END OVERSTRIKE (EOS) | X'76' | TBD | TBD | TBD | |
| TEMPORARY BASELINE MOVE (TBM) | X'78' | 3-6 | 0-3 | 0-3 | DIRECTION |
| | | | 0-1 | 1 | PRECISION |
| | | | 32K | DEV LIMIT | INCREMENT |
| EMPHASIS (EPH) | X'7A' | 2 | 0-X'FF' | X'00' | BOLD |

NOTES: (1) ADD ONE TO 'TYPE' VALUE TO CAUSE CHAINING.

FIG. 6C

| CONTROL (MNEMONIC) | TYPE | COUNT | RANGE | REQD | NOTES |
|---|---|---|---|---|---|
| SET TEXT ORIENTATION (STO) <br> INLINE SEQUENCE DIR. (+I): | X'F6' | 4 | <br> X'0000' <br> X'2D00' <br> X'5A00' <br> X'8700' <br> X'FFFF' | <br> X'0000' <br> <br> <br> <br> X'FFFF' | <br> 0 DEG. <br> 90 DEG. <br> 180 DEG. <br> 270 DEG. <br> ⟶ USE LPD |
| BASELINE SEQUENCE DIR. (+B): | | | X'0000' <br> X'2D00' <br> X'5A00' <br> X'8700' <br> X'FFFF' | <br> X'2D00' <br> <br> <br> X'FFFF' | 0 DEG. <br> 90 DEG. <br> 180 DEG. <br> 270 DEG. <br> ⟶ USE LPD |
| BEGIN SUPPRESSION (BSU) | X'F2' | 3 | 0-256 AC-TIVE IDS | 0-16 AC-TIVE IDS | |
| END SUPPRESSION (ESU) | X'F4' | 3 | 0-256 AC-TIVE IDS | 0-16 AC-TIVE IDS | |

NOTES: (1) ADD ONE TO 'TYPE' VALUE TO CAUSE CHAINING.

INTERFACE PROCESS FOR AN ALL POINTS ADDRESSABLE PRINTER

This invention relates to a process for transmitting data from a host application program to an all points addressable (APA) page printer and more particularly to a process that is independent of the type of communicating medium utilized, independent of the transmission protocol, independent of the host system, independent of the particular APA printer, and independent of the type of printer technology utilized.

BACKGROUND OF THE INVENTION

In the past several years, various printing technologies have been developed which inherently contain the ability to place a dot or picture element (pel) at any point on a page. For example, laser electrophotographic printers such as the IBM 3800 and the IBM 6670 have that capability. Other types of electrophotographic printers such as light emitting diode (LED) also have that capability. Additionally, magnetic printers, ion deposition printers, and dot matrix printers can all have an all points printable capability.

An all points addressable (APA) printer is a printer such as described above which can be commanded to print a dot or picture element at any point on a page. An APA printer, therefore, is a printer which is not only capable of printing at any coordinate position but is one that contains a control unit enabling it to be commanded to do that. For example, the IBM 6670 laser printer, mentioned above, is not an APA printer although the technology of the print engine inherently had that capability. In recent years, several printers have been developed with an APA capability including the IBM 3800 Model 3.

Despite the development of APA printers, software support for advanced function printing utilizing such printers has lagged far behind the development of the print engines themselves. As a result, the inherent capabilities of the APA printers to handle various typographic fonts and to present composed pages containing a mixture of text, image, and graphics data have not been fully exploited in data processing and office systems. By graphics data is meant line drawings whereas image data is exampled by photographs.

The lack of software support for advanced function printing, however, is in large measure, attributable to the large number of new and different all points addressable printers each of which has its own unique data processing process that frequently bears little resemblance from one machine to another for an equivalent function. Furthermore, many of these processes have printing functions so primitive that a considerable amount of effort is required by the using software to prepare data for the printer.

Another factor which has inhibited the growth of host application programs utilizing APA printers has been the complexity of managing auxiliary resources such as various font patterns and electronic form descriptions that must be downloaded to the printer prior to the printing of pages. Typically, the prior art has required the host application to prepare a bit map of the information to be printed and to transmit that map bit by bit to the printer. The IBM 3800 Model 3, an APA Printer, has improved on that type of data transmission but is limited to data transmission over data channels. As a result, host application software utilizing the model 3 is usable only with the model 3 or another channel attached printer.

One major object which this invention achieves is to enable the transmission of data to be printed from a host application to an APA printer over any type of communicating medium; channel, telecommunication lines, local area network, microwave, etc. and to transmit that data and utilize the full functional capability of an APA printer without regard to the type of transmission protocol in use. Furthermore, the process of this invention attains the object of making the host application software completely independent of the type of printing technology used at the APA printer. That is, the printer can utilize any type of printing technology and it can have any type of microprocessor associated with the printer control unit processing the commands and data received through use of the inventive process. Moreover, the process enables the transmission of any kind of data type, that is, textual data, image data, graphics data, or bar code data. Additionally, the process enables these different data types to be mixed together for presentation on a single page.

As a result of the use of the process of this invention, designers of APA printers are free to pursue any type of technology and be assured of a large well-developed range of application host software available to use the product when it becomes available.

Additionally, use of the process of this invention enables software designers to develop better and better software for utilizing the capabilities of APA printers without fear of their products becoming obsolete because they are tied to a particular printer or a particular print technology. Use of the process of this invention makes the software usable with any APA printer and moreover, makes it usable over any type of communicating medium.

SUMMARY OF THE INVENTION

This invention is a process for interconnecting an all points addressable printer with a host application program wherein the application presents output to be printed to the printer and wherein the host application can be present on a variety of different computing equipment such as a large host computer, a standalone workstation, or workstation on a local area network and wherein the all points addressable page printer can utilize any type of printing technology such as electrophotographic, magnetic or other and wherein the printer and the application host are interconnected by any type of communicating means such as a channel, local area network, or telecommunication line and wherein any type of transmission protocol can be used and wherein the process enables the transmission of commands and data from the host application to the printer in a manner which is independent of the communication means and transmission protocol. And, finally, wherein the process enables the transmission of a variety of types of data including text, graphics, image, or bar code which may be merged together on a single printed page.

The process makes use of structured field data streams designed to manage and control printer processes. It allows users to position text, images, graphics, bar codes, page segment objects, and electronic overlays at any defined point on a printed page. The structured field format is placed in the data field of the transmission protocol and thereby allows both data and commands to be passed to a printer independent of the transmission protocol or the workstation. The process enables printers to be attached to hosts by channels, controllers, or any type of networking link. The process enables the host program to control the media handling capabilities of the printer to enable multiple "logical" pages to be printed on a single physical page. It enables the host application to request duplexing, select source drawers, jog the output in output bins, and specify other operations dealing with paper. The process provides the means for managing the downloading of fonts, symbol sets, and stored objects such as overlays and page segments that are required at presentation time to construct the printed page. Finally, the process provides the means for returning error information and performing recovery actions.

The process enables the presentation of data to the printer in a two-dimensional presentation space called a logical page. Each presentation point on the logical page is addressable and individual characters and/or individual blocks of text, image, graphics and bar code data may be positioned and printed at any point on the logical page.

The process enables the page to consist of text only, to consist of a single block of data which may be text, raster image, graphics or bar code or any mixture of these data types. The process enables the transmission of data without restriction of the number of different data types or unique data blocks that can be presented on a single page.

Blocks are independent data objects of a specific data type to be presented in an output area on a page. Blocks may be positioned on the page offset from the origin of the page or relative to a text coordinate position on the page. Blocks may also be rotated to appear at any one of four 90-degree orientations. Block data may also be scaled or clipped by the printer to fit the output area.

The process includes the concept of overlays and page segments which are user defined objects that may be downloaded and stored by local names in the memory of the printer. Commands may then be sent within the process to request those objects be electronically merged in a variety of combinations with variable information on the pages that are sent to the printer. Like pages, overlays, and page segments may consist of mixtures of text, image, graphic, and bar code data.

An overlay is a fixed preformated data block to be merged onto the page that is being printed. There is no interaction with the variable data defined within the page and the data contained within an overlay definition. For example, the logical page may be printed with a specific font but the overlay will be printed using whatever font was specified with it when it was constructed. Overlays may be used, for example, to place a letterhead on a memo or to replace preprinted paper forms. Overlays may contain other overlays.

Page segments are like pieces of pages to be merged with other variable information on the page to be printed. They are used to represent commonly referenced data such as canned paragraphs or personal signatures. They are downloaded once into the printer. Unlike overlays, page segments are presented by the printer using the active fonts and other resources associated with the page in which it is included.

Fonts are resources used by printers to present coded character information that appears in text or vector graphic pictures or bar code symbols. The process provides the host application considerable flexibility over the management of fonts so that many different fonts can be referenced and printed on a single page.

The process involves the establishment of a first independent state in which the host application and the printer communicate with one another to establish device control parameters. During this process state, the printer communicates to the application host its identity, that is, the printer type and model and it communicates the data type or types, that is, text, graphic, image, and/or bar code for which the printer supports the reception of presentation control commands and data. It may also identify to the application host any limitations which it may have on the support of presentation control commands.

The first state of the process also enables the application to establish logical page parameters, and overlay or page segment space parameters. The application is enabled to establish the location of logical pages on physical pages. In this first state, the application is enabled to specify the number of prints to be produced, whether they are to be simplexed or duplexed, whether overlays and/or page segments are to be used, and whether some data is to be suppressed in order to simulate "spot" carbons. Finally, the first state enables the printer to identify printer resources resident in printer memory such as fonts, page segments and overlays.

Once the device control parameters have been established, the process enables a second state wherein the different data types, text, graphics, image and/or bar code can be transmitted to the printer together with various definitions relating to this data. Only in the case of image data is it necessary to transmit a bit map of the data to be printed.

In a third state, various resources such as fonts, may be downloaded to supplement those fonts which may be permanently stored in printer memory.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIGS. 6A, 6B, and 6C are tables providing text controls for use with the Write Text command.

DETAILED DESCRIPTION

This process develops a structured field data stream designed to manage and control printer processes. The invention supports all points addressability, a printing concept that allows users to position text, images, graphic pictures and 'electronic' overlays at any defined point on a printed page.

The structure of the data stream allows both data and commands to be passed to a printer independent from the attachment protocol used to connect the printer to the system. More specifically, it enables the same data stream to be used for printers that are attached via channels, controllers or any type of networking link.

The scope of printing processes managed by the invention go beyond controlling how information is presented on the page. The invention also enables the 'host' process to control the media handling capabilities of the printer to enable multiple 'logical' pages to be presented on a single output medium, request duplexing, select source drawers, jog output and other operations dealing with paper. The invention also provides the means for managing the downloading of fonts, symbol sets, and stored objects such as overlays and page segments that are required at presentation time to construct the printed page. Finally, the invention provides the means for returning error information and performing recovery actions.

Figure 1:
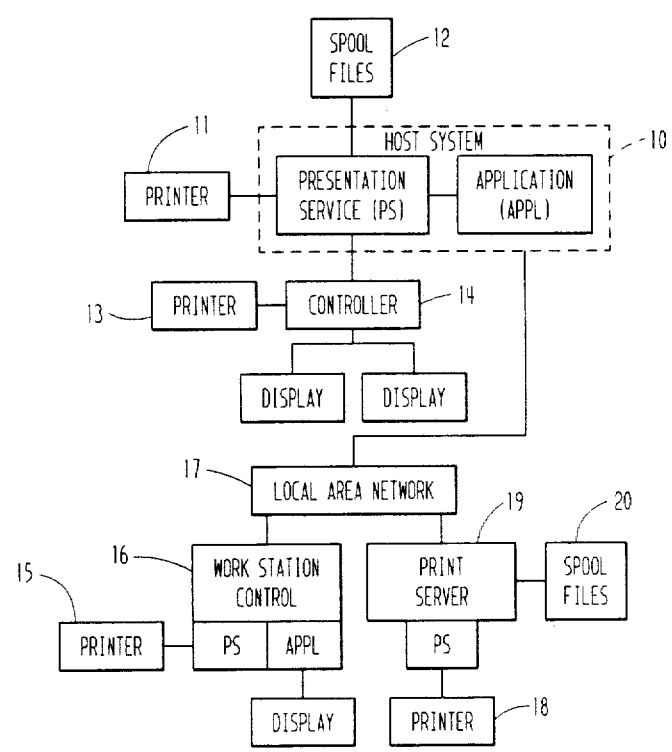
FIG. 1 shows the variety of system environments to which APA printers can be attached when the process of the invention is used. Presentation service (PS) blocks are the points within the system where the process data streams are generated.

The invention is designed to be used by programs that want or need direct control over printers. These programs may be a system facility, such as a print server program, or they may be an application within a workstation or host that wishes to control printer operation. FIG. 1 illustrates some of the system environments supported by the invention. A host computing system 10 generates commands and data for direct presentation to printer 11. The commands and data are generated from information contained on spool files 12 from application programs within host system 10. Presentation of commands and data may also be made to printer 13 through controller 14. Printer 15 receives its commands and data from workstation controller 16 and can print an output desired by application programs within the workstation controller 16 or transmitted from some other workstation on a local area network 17 or from the host system 10. A printer 18 is driven by a print server to output information from the local area network 17 or from the host system 10. Spool files 20 are provided to enable the reception of data at a greater speed than the printer operates. The boxes labelled PS (Presentation Services) are the points within the system where the printer's data streams are generated.

In order to accomplish printing from the variety of arrangements shown in FIG. 1, the commands that are sent to the printer are formally defined within the context of the operating states of a logical device. The operating states are updated by the printer during the processing of commands and are used to enforce the validity of command sequences received from the host application. If an invalid command is received for the current operating state, then a process exception exists and the host application is notified of the error.

The following operating states are defined by the inventive process. These states, and the commands causing state transitions, are illustrated in FIG. 2.

Figure 2:
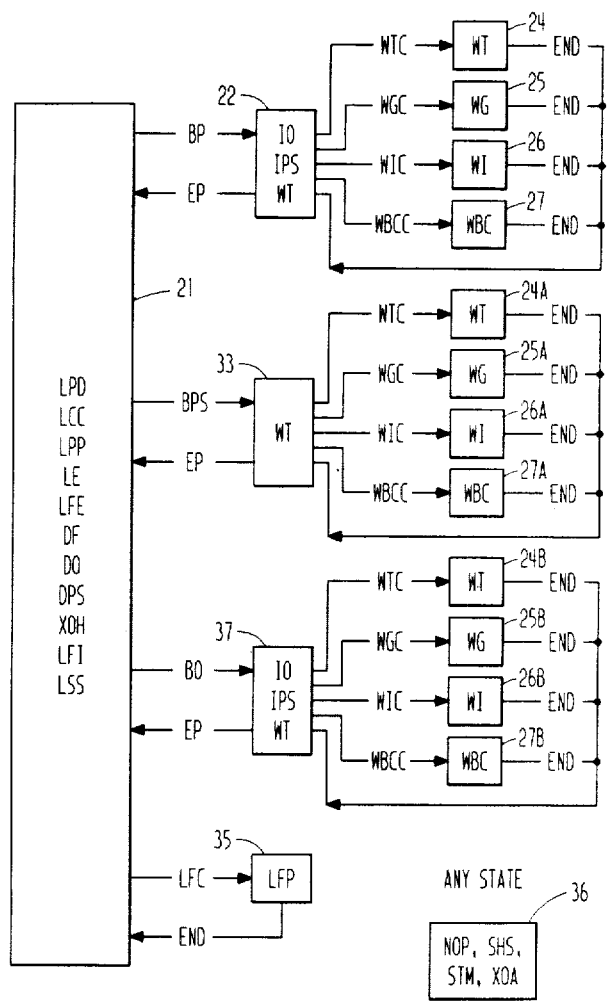
FIG. 2 is an overall flowchart showing the states of the process and showing in which state various commands can be issued.

In FIG. 2, Home State 21 is the initial operating state for a printer designed to be compatible with the data stream organized through use of the invention. Home State 21 is entered when the printer is powered on, or after an Initial Microcode Load (IML) of the printer process. Home State may also be entered as the result of receiving a Set Home State command from the driving application.

When the printer process is in Home State, it may receive control and initialization commands that prepare the device for a printing operation. It may also receive commands which request return of information from the printer. A list of some of these commands is shown in Home State 21.

Page State 22 is the operating state that is entered to cause a logical page to be written to the media.

Page State is entered from Home State as the result of receiving a Begin Page (BP) command from the host application. The logical page may be of a different physical size from the media on which it is presented. Some printers will support the capability of presenting multiple pages on the media.

When the printer is in Page State 22, it may receive commands that request previously defined and loaded overlay segments and page segments to be electronically merged with the current page being constructed. It may also receive Write Text commands that position text anywhere on the presentation space defined for the logical page. These commands are shown in Page State 22 as Include Overlay (IO), Include Page Segment (IPS) and Write Text (WT).

If the page to be presented contains individual blocks of text, image, graphics or bar code data to be positioned on the page, then this is indicated in the data stream by the presence of a Write Image (block) Control command (WIC), a Write Text (block) Control command (WTC), a Write Graphics (block) Control command (WGC), or a Write Bar Code (block) Control command (WBCC). These commands cause a state transition to occur to an appropriate state where initial conditions are established and the block of data is processed onto the page. An End command received in a Page Block State terminates that state and returns processing control back to Page State. In FIG. 2, Page Text State 24 is entered from Page State 22 through a WTC command, Page Graphics State 25 is entered through a WGC command, Page Image State 26 is entered through a WIC command, and Page Bar Code State 27 is entered through a WBCC command.

Figure 3:
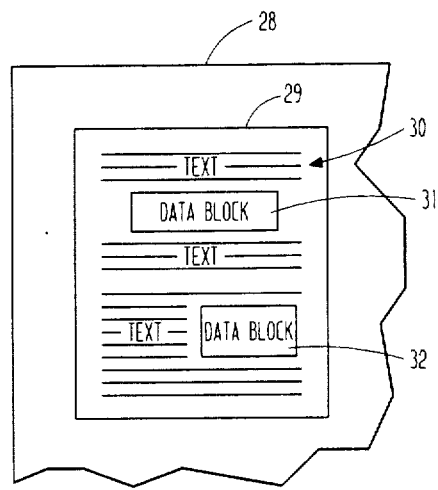
FIG. 3 shows a logical page located on a physical page with data blocks located within the logical page.

An example of the types of pages that may be constructed by a printer operating in accordance with the inventive method is shown in FIG. 3. The physical page 28 can contain several logical pages, although only one logical page 29 is illustrated in FIG. 3. Logical page 29 contains lines of text data 30, and blocks 31 and 32 of independent data. These blocks may be comprised of text, image, graphics, or bar code data.

In FIG. 2, Overlay State 37 is the operating state that is entered to cause data to be stored in the overlay memory of the printer. Overlay State is entered from the host application. A parameter of this command provides an identifier that is used to resolve later references to the overlay. The currently active Load Page Descriptor (LPD), Load Font Equivalence (LFE), and Load Equivalence (LE) values are saved as part of the stored overlay definition.

When the printer process is in Overlay State it may receive the same presentation commands that are allowed in Page State 22. The processing state descriptions for data blocks encountered in the data stream are analogous to those previously described for Page State. FIG. 2 shows Overlay Text State 24B, Overlay Graphics State 25B, Overlay Image State 26B, and Overlay Bar Code 27B.

Page Segment State 33 is the operating state that is entered to cause data to be stored in the page segment memory of the printer. Page Segment State 33 is entered from Home State 21 as the result of receiving a Begin Page Segment (BPS) command from the host application. A parameter of this command provides an identifier that is used to resolve later references to the segment. Unlike overlays, page segments assume the environment that is active at the time they are included for presentation. That is, they assume the Load Page Descriptor, Load Font Equivalence and Load Equivalence.

When the printer is in Page Segment State 33 it may only receive presentation commands to write text or blocks of text, image, bar code, or graphics blocks. The processing states for data blocks encountered in the data stream are analogous to those previously described for Page State 22. In FIG. 2, Page Segment Text State 24A is entered from Page Segment State 33 through a WTC command. Page Segment Graphics State 25A is entered through a WGC command, Page Segment Image State 26A is entered through a WIC command, and Page Segment Bar Code State 27A is entered through a WBCC command.

Operating states 35 for downloading Fonts and Programmable Symbol Sets into the printer are entered as the result of receiving a Load Font command (LFC) or Load Programmable Symbol Set command (PSS) from the host application. These commands are only valid when the printer in in Home State 21. The End command in the downloading command sequence returns the printer to Home State. The command sequences used are described hereinafter.

Certain commands can be issued without regard to the state of the process. These commands are shown in FIG. 2 under the heading Anystate 36.

As previously set forth, the process enables the presentation to the printer of four types of data; text, image, graphics, and bar code.

Presentation Text is the data type used to present lines of character information on a logical page or in a text block area on a page.

The information to be presented is represented as a string of graphic character identifications and control sequences that are sent to the printer in the Write Text command. The initial conditions governing the placement, orientation, clipping, scaling, and presentation of the data are established via control parameters that are sent to the printer in the Load Page Descriptor or Write Text (block) Control commands.

Image is the data type used to present rectangular arrays of raster data in an image block area on a page. This data may have been created originally by a scanning process or generated by a computer program.

The raster data to be presented is represented as a sequence of scan lines 'm' lines deep by 'n' picture elements (pels) wide. There may be more than one bit per pel if the image data is color or greyscale encoded. The initial conditions governing the placement, orientation, clipping, scaling, and the format of the data and the recording algorithms used to encode the image array are sent to the printer as control parameters of the Write Image Control command that prepares the printer for processing image data. The data itself is sent in the Write Image command.

Graphics is the data type used to present line art picture drawings in a graphics block area on a page.

The information to be presented is represented by a sequence of primitive drawing orders that are used by the device to construct arcs, lines, fillets, character strings, markers and other elements that define the drawing. These primitive orders, in turn, are grouped into one or more drawing segments that are executed to present the picture.

The Write Graphics Control command is sent to the printer to establish the initial conditions governing the placement, orientation, clipping, scaling and initial drawing conditions to be used in presenting the picture data. The picture segments themselves are sent to the printer as data in one or more Write Graphics commands.

Bar Code is a data type used to support applications that require precision printing of encoded information in a form that is recognizable by scanning devices.

The controls that specify the placement, orientation, input format and output format of the data are passed to the printer as parameters of the Write Bar Code Control command. The data to be bar encoded is sent to the printer in a Write Bar Code command.

The input/output formats for bar code data are dependent upon the application that is being supported. The bar code data, for example, could represent the retail price of an item or the paper storage form of a computer program.

The responsibility for defining and registering specific bar code algorithms rests with the product that has the bar code requirement.

It should be noted that bar code characters could be generated by applications and passed to the printer as special fonts or image data. In this case, the data type used is Text or Image respectively. If this technique is used, then it is the host's responsibility to insure that the output data conforms to the tolerances specified in the bar code standard.

The commands defined by the inventive method will now be briefly summarized. The commands may be divided into three functional categories as described below.

Device Control Commands: Commands for controlling basic device operations, error reporting and recovery, and construction of logical pages on the media.

Presentation Control Commands: Commands for controlling placement of presentation data on a Logical Page, Overlay or Page Segment.

Resource Management Commands: Commands provided by the printer for downloading and managing fonts, symbol sets, overlays, page segments and other resources required by the device to present page data.

All commands and the Acknowledge Reply by the printer have the same general format as shown below. The most significant bit is referred to as bit 0.

```
Bytes
0       1       2       3       4       5       6       7    n
                                                           /  /
| Command Lngth | Command ID | Flags | Corr. Num. | Data |
                                                           /  /
```

DEVICE CONTROL COMMANDS

The following commands apply to all printer products that implement the invention.

Sense Type & Model (STM, X'D6E4') (Required)

Sense Type & Model is a command that is sent to the printer by a host application to request information that identifies the type and model of the device and the function sets of the invention that are supported by the device. The information requested is returned by the device in the Special Data (SD) portion of an Acknowledge Reply to the STM command.

STM may be used in a number of ways by the host application. For example, if the STM reply indicates that overlays are not supported by the device, then the host may choose to merge the overlay presentation data into the page command stream that is sent to the printer. The major value of STM is the enabling of design decisions by host applications.

Acknowledge Reply (ACK, X'D6FF') (Required)

An Acknowledge Reply is sent from the printer to the host to indicate that a received command (or command sequence) requesting acknowledgement has been accepted for processing—or that an exception condition has been detected in the processing of a command.

If the received command requesting acknowledgement is one that asks for specific printer information, then that information is returned in the Special Data (SD) portion of the Acknowledge Reply. If the Acknowledge Reply is generated by the device as the result of detecting an error, then this is indicated in the reply and exception information concerning the error is returned in the data portion of the acknowledgement.

The sending of an Acknowledge Reply by the printer is done either synchronously or asynchronously depending on whether the reply is positive (a synchronous response to a request) or negative (an asynchronous exception report).

Set Home State (SHS, X'D697') (Required)

The Set Home State command is sent to return the printer to Home State. If the printer is already in Home State no action is taken. If the printer is not in Home State then the action that is taken prior to re-entering Home State is defined in the semantics of this command. At the conclusion of processing SHM, any command that is allowed in Home State may be sent to the printer.

No Operation (NOP, X'D603') (Required)

A No Operation command may be received by the printer in any operating state. No operation is performed by the printer as a result of receiving a NOP. It's use is defined by applications.

Execute Order Homestate (XOH, X'D68F') (Required)

The Execute Order Homestate command identifies a set of subcommands (orders) that are sent to the printer to control operations concerned with the physical production of pages and the disposition of residual buffered data. Not all subcommands defined by XOH are required to be supported by devices.

Execute Order Anystate (XOA, X'D633') (Required)

The Execute Order Anystate command identifies a set of subcommands (orders) that may be sent to the printer in any operating state to control device operations or request printer/resource information. Not all subcommands defined by XOA are required to be supported by devices.

Begin Page (BP, X'D6AF') (Required)

The Begin Page command prepares the printer to receive commands that cause data to be written to the logical page presentation space on the media.

End Page (EP, X'D6BF') (Required)

The End Page command identifies the end of a command sequence sent to the printer to write data to the logical page—or to the Overlay or Page Segment memory of the printer.

Load Copy Control (LCC, X'D69F') (Required)

The Load Copy Control command provides for the production of output sides from input logical pages. Thus, for a given page, it specifies the number of copies, simplex or duplex, overlays to be used, and suppression identifiers to be enabled. (The Suppression function allows data to be selectively "suppressed" when printing. Suppression is invoked via the Begin Suppression (BSN) and End Suppression (ESN) text controls. This function can be used, for example, to simulate the effect of multi-part forms with partial carboned areas between form copies.)

Load Page Descriptor (LPD, X'D6CF') (Required)

The Load Page Descriptor command is sent to initialize the logical page parameters (and optionally, initial text parameters) that are applied at the beginning of each subsequent Page or Overlay command stream received by the printer. These values remain in effect until another LPD command is encountered in the command stream, until superceded by initialization values in a Write Text Control command, until superceded by text controls, or until an IML or power off sequence occurs in the device.

Load Page Position (LPP, X'D66D') (Elective)

The Load Page Position command specifies the location of the logical page presentation space on the physical media.

PRESENTATION CONTROL COMMANDS

The following commands apply to all printer products that implement the Presentation Text Function Set of the invention.

Write Text (WT, X'D62D') (Required)

The Write Text command is used to write text presentation data to the printer. Depending on the operating state of the process, this information will be directed to logical page presentation space or text block presentation space of the current page, the overlay or the page segment being constructed by the printer. The presentation controls that are allowed within the text stream itself, are governed by the text subset that the printer has elected to implement.

Write Text Control (WTC, X'D688') (Elective)

The Write Text Control command is sent to the printer to indicate that the command sequence that follows is directed to a text presentation block area on the current page, overlay or page segment that is being constructed by the device. The parameters of this command define the size, placement and orientation of the text block and establish the initial conditions for interpreting the text data. Upon receiving this command, the printer saves the current text states (if any) for the page, then initializes control for processing block data. If WTC is not supported and/or not received, the logical page (defined by the Load Page Descriptor command) becomes the single text presentation block to which all text data for the page is written.

End (END, X'D688') (Elective)

The End command received in text block state, terminates the processing of block data and causes the text states for the page to be restored to their previous values. Support of the End command is required for products that implement the WTC command.

Load Font Equivalence (LFE, X'D63F') (Required)

The Load Font Equivalence command is sent to the printer to associate (map) the local font identifiers embedded in the text data via Set Coded Font Local controls with the appropriate code page, character set and font required to present the graphic characters. This information is used by the printer to correlate printing of text with the proper font resource.

The correlation function provided by this command is independent of any specific font technology implemented by the printing device. That is, the device may resolve this mapping to stored font raster patterns downloaded from the host, permanently resident patterns, or to print wheels that are mounted on the device.

Load Equivalence (LE, X'D61D') (Elective)

This command maps "internal" values embedded in data stored within the printer to "external" values that may be referenced separately. For example, the internal Suppression value of X'02' may be referenced externally on a Load Copy Control as a X'06' provided that an appropriate Load Equivalence command was previously received.

IMAGE CONTROL COMMANDS

The following commands apply to all printer products that implement the Image Function Set.

Write Image Control (WIC, X'D63D') (Required)

The Write Image Control is sent to the printer to indicate that the command sequence that follows is directed to an image presentation block area on the current page, overlay or page segment that is being constructed by the device. The parameters of this command define the input and output size of the image array and the necessary information for interpreting the non-coded information (NCI) raster input data. Depending on the Image Function Set selected, parameters of this command may also request operations to be performed on the input image array by the device prior to presentation.

Write Image (WI, X'D64D') (Required)

This command transmits image data to the printer.

End (END, X'D65D') (Required)

The End command received in image block state, terminates the processing of image data and causes return to the prior presentation state of the process.

GRAPHICS CONTROL COMMANDS

The following commands apply to all printer products that implement the Graphics Function Set.

Write Graphics Control (WGC, X'D684') (Required)

The Write Graphics Control command is sent to the printer to indicate that the command sequence that follows is directed to a Graphics presentation block area on the current page, overlay or page segment that is being constructed by the device. The parameters of this command define the size, placement and orientation of the graphics block and establish the initial conditions for interpreting the graphic data.

Write Graphics (WG, X'D685') (Required)

This command transmits graphic data to the printer.

End (END, X'D65D') (Required)

The End command received in graphics block state, terminates the processing of graphic data and causes return to the prior presentation state of the printer.

BAR CODE CONTROL COMMANDS

The following commands apply to all printer products that implement the Bar Code Function Set.

Write Bar Code Control (WBCC, X'D680') (Required)

The Write Bar Code Control command is sent to the printer to indicate that the command sequence that follows is directed to a Bar Code presentation block area on the current page, overlay or page segment that is being constructed by the device.

Write Bar Code (WBC, X'D681') (Required)

This command transmits bar code data to the printer.

End (END, X'D65D') (Required)

The End command received in bar code block state terminates the processing of bar code data and causes return to the prior presentation state of the printer.

RESOURCE MANAGEMENT COMMANDS

The following commands apply to all printer products that implement the Loaded Font Function Set. This is a resource function set. Products that implement the Coded Font commands (Load Font Index, Load Font Control, Load Font Patterns) of this function set must also implement the Presentation Text Function Set.

Load Font Control (LFC, X'D61F') (Required for Coded Fonts)

The Load Font Control command provides control information which enables the parsing of the font raster patterns which are about to be loaded via the Load Font Patterns command.

Load Font Index (LFI, X'D60F') (Required for Coded Fonts)

The Load Font Index command transmits a Font Index Table containing the information needed to print a complete set of 256 characters (referred to as a Coded Font).

Load Font Patterns (LFP, X'D62F') (Required for Coded Fonts)

A sequence of one or more Load Font Patterns commands is used to transmit the Coded Font character raster patterns to the printer. Font character raster patterns are received as a string of bits representing the character pels.

Load Symbol Set (LSS, X'D61E') (Elective)

A condensed and simplified command for the loading of font control index, and raster pattern information for one or more font characters. This command can be used alone or in conjunction with Coded Fonts.

End (END, X'D65D') (Required)

As used in this function set, the End command received in Font Index State causes the printer to move to Font State. The End command received in Font State causes the printer to return to Home State.

The following commands apply to all printer products that implement the Page Segment Function Set. This is a resource function set. Products that implement this function set must also implement at least one of the Text, Image, Graphics, or Bar Code Function Sets.

Begin Page Segment (BPS, X'D65F') (Required)

This command defines a segment of page data which is not to be printed at this time but is to be saved within the printer. This page segment is included later via an Include Page Segment command. The definition of the page segment is terminated by an End Page command. The page segment itself is contained between the Begin Page Segment and the End Page commands.

Include Page Segment (IPS, X'D67F') (Required)

This command causes a previously stored set of commands (the page segment) to be processed in the input stream as though they were just received from the host.

Delete Page Segment (DPS, X'D66F') (Required)

This command causes either a single page segment or ALL page segments to be deleted.

End Page (EP, X'D6BF') (Required)

As used in this function set the End Page command identifies the end of a command sequence sent to printer to write data to the page segment memory and returns the printer to Home State.

The following commands apply to all printer products that implement the Overlay Function Set. This is a resource function set. Products that implement this function set must also implement at least one of the Text, Image, Graphics, or Bar Code Function Sets.

Begin Overlay (BO, X'D6DF') (Required)

The Begin Overlay command defines data which is not to be printed at this time but is to be saved within the printer as an overlay. An overlay may contain the same information and is built in the same way as a logical page. The key distinction between these two data constructs is that overlays are stored while logical pages are printed. The overlay definition is terminated by an End Page command.

A stored overlay is later merged with ordinary printed pages either via the Include Overlay command or by the Load Copy Control command.

An overlay definition may contain zero or more Include Overlay or Include Page Segment commands.

The current Load Page Description and Load Font Equivalence records, if any, become part of the definition of the overlay. The definition of the overlay is terminated by an End Page command. The overlay itself is contained between the Begin Overlay and the End Page commands.

Include Overlay (IO, X'D67D') (Required)

This command causes a previously stored overlay to be merged onto the current page.

Delete Overlay (DO, X'D6EF') (Required)

This command causes either a single overlay or ALL overlays to be deleted.

End Page (EP, X'D6BF') (Required)

As used in this function set the End Page command identifies the end of a command sequence sent to printer to write data to the overlay memory and returns the printer to Home State.

EXAMPLE

A command stream in accordance with the invention is now presented. The example assumes that the host system is preparing the printer to receive the first page of a multi-page print job that requires use of overlays, page segments and special fonts. It shows the initializing command sequences that are sent to the printer and the command sequence that is sent to cause the first page to be printed. Acknowledge Responses shown are assumed to have been requested in the previous command (via the ARQ flag bit).

The command sequences shown are based on a fully featured printer that supports the operational states shown in FIG. 2. This state machine, along with the command descriptions given in previous sections, can be used to identify the operational state changes of the printer as various commands are processed.

In the example, it is important to observe that the data downloaded in overlay or page segment state, could have been sent directly in page state to accomplish the same result.

| | | |
|---|---|---|
| Initialization Sequence 1 | STM | Sense Type and Model |
| | ACK | Acknowledgement Response |
| Initialization Sequence 2 | XOA9RPI) | Request Printer Information |
| | ACK | Acknowledgement Response |
| | SHS | Set Home State |
| | LPD | Load Page Description |
| Preparatory Sequence | LPP | Load Page Position |
| | LCC | Load Copy Control |
| | LFE | Load Font Equivalence |
| | ACK | Acknowledgement Response |

-continued

| | | |
|---|---|---|
| Coded Font Download Sequence | LFC | Load Font Control |
| | LFP | Load Font Patterns |
| | : | : |
| | LFP | Load Font Patterns |
| | END | End |
| | LFI | Load Font Index |
| | ACK | Acknowledgement Response |
| | BPS | Begin Page Segment |
| Page Segment Sequence | WT | Write Text |
| | : | : |
| | WT | Write Text |
| | WIC | Write Image Control |
| Page Segment Image Block | WI | Write Image |
| | : | : |
| | WI | Write Image |
| | END | End |
| | WT | Write Text |
| | : | : |
| | WT | Write Text |
| | EP | End Page |
| | ACK | Acknowledgement Response |
| | BO | Begin Overlay |
| Overlay Sequence | WT | Write Text |
| | : | : |
| | WT | Write Text |
| | IO | Include Overlay |
| | IPS | Include Page Segment |
| Overlay Graphics Block | WGC | Write Graphics Control |
| | WG | Write Graphics |
| | : | : |
| | WG | Write Graphics |
| | END | End |
| | WT | Write Text |
| | : | : |
| | WT | Write Text |
| | IO | Include Overlay |
| | IPS | Include Page Segment |
| | EP | End Page |
| | ACK | Acknowledgement Response |
| | BP | Begin Page |
| Page Sequence | WT | Write Text |
| | : | : |
| | WT | Write Text |
| | IO | Include Overlay |
| | IPS | Include Page Segment |
| Page Image Block | WIC | Write Image Control |
| | WI | Write Image |
| | : | : |
| | WI | Write Image |
| | END | End |
| | WT | Write Text |
| | : | : |
| | WT | Write Text |
| | IO | Include Overlay |
| | IPS | Include Page Segment |
| | EP | End Page |
| | ACK | Acknowledgement Response |

COMMAND PROCESSING RULES

The structured field format allows one or more commands to be sent to the printer in a continuous stream as shown below. Each command is self describing with respect to type and length. Each command is processed by the printer in the order received according to the command semantics. The end of a command stream sequence is indicated to the printer whenever the Acknowledge Required (ARQ) flag is set to '1' in the Flag byte of a command received.

Host Acknowledgement Requests

The host will set the Acknowledgement Required flag 'on' in a command in two general instances:

1. The ARQ flag is set 'on' in the last command of a command sequence when the host wants a Positive Acknowledgement (ACK) that printer has received and accepted the command sequence for processing.

2. The ARQ flag is set 'on' in commands that are sent by the host to request return of printer information. For example, an STM or XOA (read font list) command.

After sending a command requesting acknowledgement, the host is not allowed to send any further commands until it receives an Acknowledge Reply from the printer. All such commands received will be discarded until the printer has had the opportunity to respond with the acknowledgement reply.

If the printer receives a command that is normally used to request return of printer data, but does not have the acknowledge required flag on, then the command is treated as a no-operation request and no error is generated.

Logical lockouts that may occur as the result of a host failing to adhere to the rules described above are cleared by the protocols of the underlying communications system.

A Positive Acknowledgement (ACK) at the end of a command stream is equivalent, in terms of command validation, to an ACK on each and every command within that stream. An ACK is an indication that, within the command processing rules specified herein and the limitations of the printer, all commands since the last Acknowledgement (ACK or NACK) are correct. Specifically, ACKed commands at least do not violate the state machine, are of valid lengths, and have been accepted for further processing. In addition, an ACK of an END or an End Page command, which ends the loading of a complete object, i.e., font, page segment, overlay, image, or page, by the preceding sequence of commands, indicates at least that the complete object has been accepted for processing.

Printer Acknowledgement Replies

An Acknowledge Reply is sent from the printer to the host to indicate that a received command (or command sequence) requesting acknowledgement has been accepted for processing or that an exception condition has been detected in the processing of a command.

ACKs are always sent synchronously, i.e., in response to an Acknowledgement Request (ARQ). Negative Acknowledgements (NACKs) are sent either synchronously or asynchronously, depending on the nature of the error and the time of discovery.

There are three general cases to consider:

1. If the received command requesting acknowledgement is one that asks for specific printer information, then a Positive Acknowledge Reply.

2. If the received command requesting acknowledgement is one that does *not* ask for printer information, then a Positive Acknowledgement (ACK) is sent and no information is returned in the data portion of the Acknowledge Reply.

3. If the Acknowledge Reply is generated by the device as the result of detecting an error, then a Negative Acknowledgement (NACK) is sent and an exception code and information concerning the error is returned in the data portion of the NACK. Thus, a NACK is an indication that a command stream or device error has been detected.

If the printer has been instructed not to take an Alternate Exception Action, then a NACK causes all upstream commands to be discarded so that the printer is ready to receive the host response to the NACK as the next command.

Only one error is returned per NACK.

COORDINATE SYSTEMS

All location parameters are expressed in terms of one of two different coordinate systems: X,Y, or I,B. Both coordinate systems express distance measurements in terms of "L-units".

X,Y Coordinates

The X,Y coordinate system, also called the media coordinate system, is directly related to the media or physical page. The X,Y coordinate system is fixed for each media size. Neither the origin nor the orientation of these coordinates can be changed by commands.

The origin (X=0, Y=0) of this orthogonal coordinate system is always at the top left hand corner of the physical sheet. +X values begin at the origin and increase along the top of the sheet. +Y values begin at the origin and increase along the left side of the sheet. The definition of the sheet "top" is device dependent.

The command stream of the invention describes sheets to be printed in terms of logical pages. The logical page is a rectangular area which is located with respect to the physical page by an offset from the physical page origin to the logical page reference corner. The logical page need not be completely contained on the physical page, however printing can only take place where the two areas overlap. The logical page reference corner is the corner of the logical page which is at the smallest, or most negative, X,Y position. The logical page offset is set by default or by the Load Page Position command. This corner is not necessarily coincident with the physical page origin at X=0, Y=0. The size of the logical page is set by default or by the Load Page Description command. The logical page size in the X dimension is termed the "Y-Extent".

Figure 4:
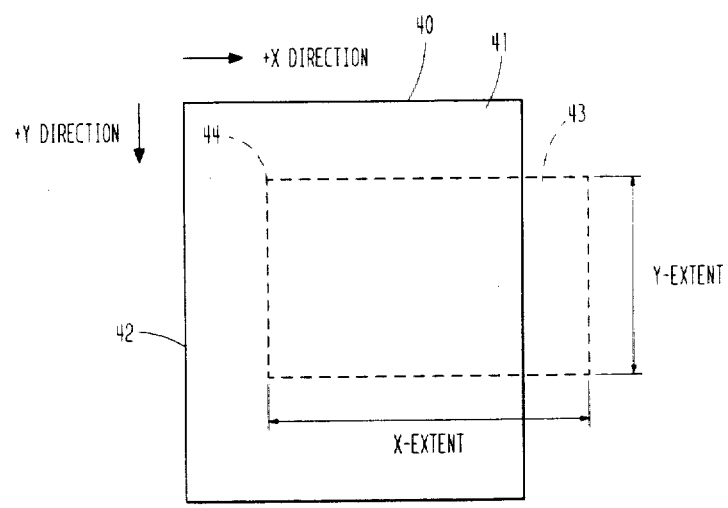
FIG. 4 shows the X,Y relationship between physical and logical pages.

FIG. 4 illustrates the physical and logical page relationship. The X axis is coincident with the top of physical page 41 and the Y axis 42 is coincident with the left side of page 41. The intersection of 40 and 42 defines the origin. The logical page 43 reference corner 44 is located with respect to the origin.

I,B, Coordinates

Inline (I) and Baseline (B) coordinate axes are used to describe the placement and orientation of text and/or images on the logical page. The printer places characters along the I axis to form a line of text. The B axis is the direction in which the printer places lines of text on the page. Both the origins and the orientation of the I and the B axes can be changed by commands from the host application.

The direction in which the inline coordinate is incremented as characters are developed on a page is termed either the "positive inline direction", "inline sequence direction", "inline direction", or simply, +I. The direction in which the baseline coordinate is incremented as lines are developed on the page is termed either the "positive baseline direction", "baseline sequence direction", "baseline direction" or simply, +B.

The distance by which the inline coordinate is incremented as characters are developed on the page is referred to as the "Character Increment". The distance by which the baseline coordinate is incremented as lines are developed on the page is referred to as the "Baseline Increment".

The "development" of characters and lines on a page refers to their sequence of transmission which typically corresponds to the sequence in which they will be read.

The printer may vary the actual character and/or line placement sequence as it chooses (as in bidirectional printing).

The +I and +B directions are specified independently in terms of an angle from the +X direction. This orientation can be set in the Load Page Description, via embedded commands in the Write Text command or by default. Setting the orientations of the +I and +B axes also implicitly sets their origins along one of the four edges of the logical page.

The device microcode may allow non-orthogonal +I and +B directions, however the results of such a situation are not here specified.

The coordinates of the first print position on the logical page are called the "initial inline print coordinate" (Ii) and the "initial baseline print coordinate" (Bi). The coordinates of the current print position on the logical page are called the "current inline print coordinate" (Ic) and the "current baseline print coordinate" (Bc).

Figure 5A:
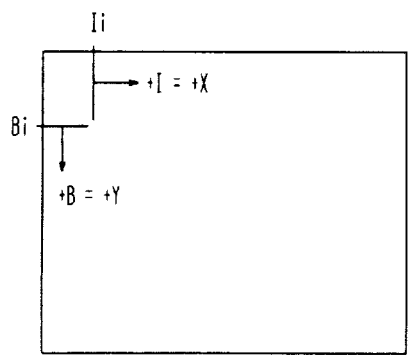
FIGS. 5A and 5B illustrate an initial text position within a logical page and the direction of text characters from that initial position.
Figure 5B:
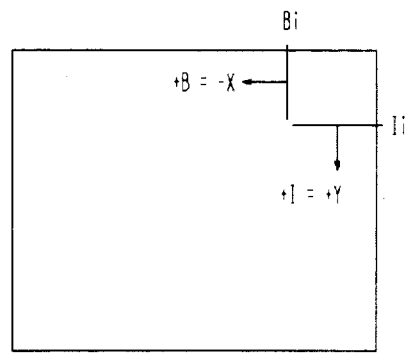

FIGS. 5A and 5B show the relationship of two sets of typical I,B coordinates to the logical page.

DEFAULT HANDLING

Defaults are values that are used for control parameters when no explicit values are specified in the command stream sent to the printer. A hierarchy of defaults is defined by the process to allow defaults to be invoked at each of the processing levels involved in constructing pages to be printed.

Process default logic is invoked in two ways. The first is through omission whereby no command has been received by the printer to establish explicit values required to build the output page. In this case the values used are the initial machine setting values specified by the printer. The second is through the encoding of parameter values themselves that are passed to the printer in the operand or data fields of commands. A value of all binary ones, i.e., X'FF', in the parameter field of a command means 'use the current default'.

If the value X'FF' is specified in a command that is initializing conditions for processing block data, then the value used is the value specified in the Load Page Descriptor. If X'FF' is specified for a parameter field of the Load Page Descriptor, then the value used is that specified by the product.

Load Page Descriptor settings are established upon receiving a LPD command from the host. LPD values for a given page may be superceded by values in a Write Text Control command, or by text controls. The most recent LPD values are always restored upon receipt of a Begin Page or Begin Overlay command.

Initial data block settings are established upon receiving a Write Text, Image, Graphics or Bar Code Control command from the host. These settings remain in effect until they are overridden by data controls or until an End command is received terminating the presentation state for the block.

All previously transmitted values are lost and initial machine settings are re-established at IML or power on time for the printer. These values remain in effect until explicitly overridden by commands received from the host application.

EXCEPTION HANDLING

An exception exists whenever a printer detects an invalid or unsupported command, control or parameter value in the data stream received from the host.

Each exception condition has been assigned a unique exception code. These codes, and their meaning, are documented in "Exception Reporting Codes".

The process provides the host application with control over how the printer is to handle exceptions. This control is specified in "XOA Exception Handling Control" command. The XOA(EHC) order permits independent control over three exception handling functions:

1. The reporting of exception conditions and related error information via Acknowledge Replies.

2. The invocation of Alternate Exception Actions, AEAs, when a valid parameter value is received but not supported by the printer.

3. The termination/continuation procedure to be followed in completing construction of the current page.

The host application may use the Exception Handling Control order to accomplish many specific control capabilities required in mixed data printing environments. For example, through the proper selection of settings it is possible to:

Enforce fidelity control over printing of page information.

Enable automatic skipping of data types not supported by the printer.

Suppress return of meaningless or redundant exception reports when alternate actions are acceptable to end users.

And many other quality control operations associated with printing.

The Exception Handling Control order may be issued in any printer operational state and thus can be used to manage exception processing at any level of granularity desired by the host application.

MIXING RULES

Mixing rules for data within a block, i.e., exclusively Text, Image, Graphics, or Bar Code data, are specified by the respective data type.

For block-to-block mixing, i.e., overlapping blocks, the process specifies a mixing rule for bilevel (print or no-print) devices. The rule is: Blocks are transparent. This means that if a pel is "on" in any block, then this pel is always "on" regardless of how many other overlapping blocks have this pel "off".

FUNCTION SETS

The invention makes it possible to match the functional requirements of a wide range of printer products to a number of different system environments. Since not all printers or using systems require all capabilities, the process has been divided into major functional areas, called Function Sets. In that manner, product developers may utilize process portions to match with the specific needs of their product.

All products must include the Device Control process. That process contains commands that are fundamental in controlling command flow between the printer process and the host and for preparing the device for a printing operation. The Base Device Control process, by itself, performs no printer function. It must always be supplemented by at least one Data Type process, for example, a text printing process.

Each Data print process (function set) represents a major printer capability that may be offered by a product. Within a given function set there may be more than one level of capability. If so, these levels form nested subsets in the sense that each additional process level requires full support of the previous level.

To utilize the invention, a product must implement all mandatory function processes in the base Device Control function set, and at least one level of one of the following Data Type function set processes: Text, Image, Graphics, or Bar Code.

To utilize one of the four Data Type Function Sets or a Function Set level thereof, a product must implement all required commands, orders, and controls for that Function Set or Function Set level and must support the required range for every parameter of each such command, order, and control.

All function set implementation must conform with the logical printer state machine shown in FIG. 2.

A host application determines the functional capabilities of a printer by issuing a Sense Type and Model (STM) command to the printer with an acknowledgement required. The data that is returned by the printer in the Acknowledge Reply identifies the type and model of the device and contains Function Set vectors for each function set supported. These vectors further define the levels supported and basic properties of the function set implementation.

Device Control Function Set

The Device Control Function Set contains the commands required to set up the page, communicate device controls, and manage the a Acknowledge protocol.
Function Set Identifier: X'C4C3' Device Control
Function Set Level Identifiers: X'FF10' DC/1
Function Set Properties: None.

Text Function Set

The Text Function Set contains the commands and data controls required to present text information on a logical page, page segment or overlay area on the media.
Function Set Identifier: X'D7E3' Presentation Text
Function Set Level Identifiers:
    X'FF10' PT/1
    X'FF20' PT/2
Function Set Properties:
Ordered Data Property Identifier: X'10'
    X'00': Line sequential text only supported
    X'01': Unordered text supported
Block Support Property Identifier: X'20'
    X'00': Text blocks not supported
    X'01': Text blocks supported
Color Support Property Identifier: X'40'
    X'00': Color not supported
    X'01': Color Supported The required commands in this Function Set are the Load Font Equivalence command (LFE) and the Write Text command (WT). Elective commands (required if text blocks are supported) include the Write Text Control command (WTC) and the End (END) command.

Image Function Set

The Image Function Set contains the commands and data controls required to present image raster data on a logical page, page segment or overlay area on the media.
Function Set Identifier: X'C9D4' Image
Function Set Level Identifiers:
    X'FF10' IM/1
    X'FF20' IM/2
Function Set Properties:
Ordered Data Property Identifier: X'10'
    X'00': Sequentially ordered blocks supported
    X'01': Unordered image blocks supported
Color Support Property Identifier: X'40'
    X'00': Color not supported
    X'01': Color Supported The command, all required for this Function Set, include the Write Image Control Command (WIC), the Write Image Command (WI) and the End (END) command.

Graphics Function Set

The Graphics Function Set contains the commands and data controls required to present vector graphic pictures on a logical page, page segment or overlay area on the media.
Function Set Identifier: X'E5C7' Graphics
Function Set Level Identifiers:
    X'FF10' DR/1
    X'FF20' DR/2
    X'FF30' DR/3
Function Set Properties:
Ordered Data Property Identifier: X'10'
    X'00': Graphic blocks must be first blocks sent for page or appear in sequential order with other data on the page
    X'01': Graphic blocks may be set in any order
Color Support Property Identifier: X'40'
    X'00': Color not supported
    X'01': Color Supported The commands, all required for this Function Set, include the Write Graphics Control command (WGC), the Write Graphics command (WG) and the End (END) command.

Bar Code Function Set

The Bar Code Function Set contains the commands and data controls required to present bar code information on a logical page, page segment or overlay area on the media.
Function Set Identifier: X'C2C3' Bar Code
Function Set Level Identifiers: X'FF10' BC/1
Function Set Properties:
Ordered Data Property Identifier: X'10'
    X'00': Sequentially ordered blocks supported
    X'01': Unordered bar code blocks supported
Color Support Property Identifier: X'40'
    X'00': Color not supported
    X'01': Color Supported The commands, all required for this Function Set, include the Write Bar Code Control command (WBCC), the Write Bar Code command (WBC) and the End (END) command.

Overlay Function Set

The Overlay Function Set contains the commands required to store, delete and present information that is retained in the overlay memory of the printer. These commands are independent of any specific data types used in defining the overlay.
Function Set Identifier: X'D6D3' Overlay
Function Set Level Identifiers: X'FF10' OL/1
Function Set Properties:
Nesting Property Identifier: X'50'
    X'00': Page Segments that are referenced by Include commands in Overlay State must exist in the printer when referenced.

X'01': Page Segments that are referenced by Include commands in Overlay State need not exist in the printer when referenced.

The commands, all required for this Function Set, include the Begin Overlay command (BO), the Delete Overlay command (DO), and the Include Overlay (IO) command.

Page Segment Function Set

The Page Segment Function Set contains the commands required to store, delete and present information that is retained in the page segment memory of the printer. These commands are independent of any specific data types used in defining the page segment.
Function Set Identifier: X'D7E2' Page Segment
Function Set Level Identifiers: X'FF10' PS/1
Function Set Properties: None The commands, all required for this Function Set, include the Begin Page Segment command (BPS), the Delete Page Segment command (DPS), and the Include Page Segment (IPS) command.

Loaded Font Function Set

The Loaded Font Function Set contains the commands required to download and delete font information that is retained in the font storage of the printer.

COMMAND DESCRIPTIONS

A detailed description of commands implementing selected function sets will now be described.

The following definitions apply:

Range—This term, used most often as a column heading in the command summary figures, indicates the complete set of valid values for a given parameter.

RQRD (Required)—Used as a column heading in the command summary figures. Indicates the parameter range that *must* be supported by any device which supports the command.

Signed Binary—Indicates that a number so identified may be either positive or negative and that, only when negative, is in two's complement form. Negative values are identified by a high order bit '1'.

Positive Binary or Binary—Indicates an unsigned binary value. High order bit must be '0'.

Reserved—Some fields are either "Reserved for compatibility", i.e., existing products use these fields but the inventive process does not, "Reserved for future use", i.e., by the process or just "Reserved", (same as 'Reserved for future use'). No checking is required on the contents of any of these types of reserved fields, however, good practice dictates that such fields be set to the specified value (if one exists) or to zero.

Byte n—Each command description provides a detailed description of the "data" portion of the command. Thus, "Byte 0" of the command data is the byte immediately following the Flag byte in the command header. (Or following the Correlation Number, if present).

DEVICE CONTROL FUNCTION SET

Load Page Descriptor

Before the printer can present a page of data, it must know the units in which distances have been measured, the boundaries of the logical page on which the data is to be placed, and initialization values for control parameters, e.g., margin settings and line spacing. These parameters can either be set via device defaults or explicitly via the LPD command.

The controls established in a Load Page Descriptor command remain in effect until the next Load Page Descriptor is received unless superseded by explicit controls in other commands, i.e., embedded Write Text controls. In any case, the latest LPD control values are restored with each Begin Page or Begin Overlay command.

The length unit (L-unit) is the unit in which distance measurements are expressed at the printer.

Byte 0: X Unit-base
  X'00' indicates the X-direction unit of measurement (unit-base) is inches.
  X'01' indicates the unit of measurement is centimeters.

Byte 1: Y Unit-base
  X'00' indicates the Y-direction unit of measurement (unit-base) is inches.
  X'01' indicates the unit of measurement is centimeters. Y Unit-base must equal X Unit-base.

Bytes 2-5: L units per unit-base
  Bytes 2-3 contain a binary parameter expressing the number of units per unit-base in specifying the distance measurements in the X direction. For example, if the unit-base is inches and this value is 1440, then L Units=1440 units per inch.
  All printers are required to support L Units=1440 units per inch. Support of other L Unit values is elective.
  Bytes 4-5 contain a binary parameter expressing the number of units per unit-base used in specifying the distance in the Y direction. Y length units must equal X length units.

Byte 6: Reserved for future use.

The logical page size is described in terms of the X,Y coordinate system. There is no relationship between the logical page size and the size of the *physical* medium on which the logical page is positioned (via the Load Page Position command). Thus, the logical page may be larger, smaller, or equal in size to the physical medium. It is, however, an error to attempt to *print* off either the logical page or the physical medium.

Bytes 7-9: X-Extent
  The X dimension of the logical page in L-units. The valid range is 1 to 32,767.

Byte 10: Reserved for future use.

Bytes 11-13: Y-Extent
  The Y dimension of the logical page in L-units. The valid range is 1 to 32,767.

Byte 14: Reserved for future use.

Byte 15: Ordered Data Flags
  bit 0: Ordered Page Flag:
    A bit value of '1' indicates that all blocks (Text, Image, Graphics, Bar Code) and all text data within text block(s) on the page are in sequential order, i.e., no backward movement is required when the information is processed in the order received.
    A bit value of '0' indicates that backward movement is required if the page data is processed in the order received.
  bit 1: Ordered Blocks Flag:
    A bit value of '1' indicates that all blocks (Text, Image, Graphics, Bar Code) on the page are in sequential order, i.e., the presentation of sequentially received blocks—as opposed to data within the blocks—does not require backward movement.

A bit value of '0' indicates that backward movement is required.

bit 2: Ordered Text Flag:

A but value of '1' indicates that all Text data (within every Text block) are in sequential order, i.e., the presentation of sequentially received text data, within a block, does not required backward movement.

A bit value of '0' indicates that one or more Text blocks contain data that, when processed in the order received, requires backward movement.

bits 3–7: Reserved

Bytes 16–17: Reserved for future use.

Byte 18: Reserved for compatibility. Should be X'2B'.

Byte 19: Reserved for future use. Should be X'00'.

Byte 20: Reserved for compatibility. Should be X'44'.

Byte 21: Reserved for compatibility. Should be X'C0'.

Bytes 22–23: Reserved for future use. Should be X'0000'.

The values specified in the following fields are the initial text control settings for each page or overlay. In other words, all text control values are reset to the values in the latest LPD with each Begin Page and Begin Overlay command. Text controls imbedded in the text, or controls received with the Write Text Control command, can change these initial values as the page or overlay is being built.

Bytes 24–27: Inline Sequence Direction (bytes 24–25) and Baseline Sequence Direction (bytes 26–27):

Each of the above two orientation parameters contain a two byte encoding of one of the four directions: +X, +Y, −X, and −Y. These directions are represented by an angle measured clockwise from the logical page's X axis to the chosen direction and encoded as a nine-bit binary number. The high order 8 bits are expressed in the first byte of each parameter. The ninth bit is the high order bit of the second byte. The remainder of the second byte is reserved and must be zero.

The acceptable values, in degrees, are: 0 (X'000'), 90 (X'2D00'), 180 (X'5A00'), and 270 (X'8700').

The function and organization of these four bytes is the same as that of the four byte operand of the STO text control. (See "Write Text".)

Bytes 28–31: Initial Print Coordinates (Ii and Bi)

I and B coordinates are used for positioning text and image data. The print position at any given moment is called the current print position, (Ic,Bc). When a character is placed on the page, the character reference point of the character pattern is made coincident with the current print position. The character reference point can be regarded as the intersection of the leading edge of the character box and the character baseline.

At the beginning of each page, the current print position coordinates (Io and Bc) are set equal to the initial print position coordinates (Ii and Bi). Text controls may move the current print position elsewhere before the first character is printed.

FIG. 5, comprised of FIGS. 5A and 5B, shows the relationship of the text orientation coordinates to the logical page axes.

The initial print position coordinates are specified in two two-byte parameters. The first parameter is the initial I-coordinate (Ii) and is specified in L-units. The second parameter is the initial B-coordinate (Bi) and is also specified in L-units.

Other Setable Text Controls include:

Bytes 32–33: Set Inline Margin (SIM).

Bytes 34–35: Set Inter-Character Increment (SII).

Bytes 36–37: Reserved for future use.

Bytes 38–39: Set Baseline Increment (SBI).

Byte 40: Set Coded Font Local (SCFL).

Byte 41: Set Text Color (STC).

This group of text controls and their supported parameter values are described in "Write Text". If any of the above controls are defined as all ones (X'FF' or X'FFFF') in the Load Page Descriptor command, the process will assume the device defined default values.

Begin Page

This command identifies the beginning of a page. The page is terminated by an End Page command.

Error checking for the presence and content relative to a page of all included resources is performed at page build time. Missing resources will be detected as synchronous page construction errors.

The Begin Page command transmits 4 bytes of data to the printer.

Bytes 0–3: Page Identifier

A four-byte parameter which identifies the page. Any value is permitted.

This page identifier may be returned in the sense bytes of the Acknowledgement command if an error is reported back to the host system for this page. It is independent of, and not to be confused with, the command Correlation Number described in "Command Structure".

End Page

This command marks the end of a Page, Page Segment, or Overlay.

No data is transmitted with this command.

End

This command marks the end of a series of Write Text, Write Image, Write Graphics, Write Bar Code, Load Font Index, or Load Font commands, i.e., it marks the end of a Text, Image, Graphics, or Bar Code block.

No data is transmitted with this command.

No Operation

No operation is performed.

Zero or more bytes of data may be transmitted with this command but are ignored.

Sense Type and Model

This command causes the printer to prepare a record for transmittal to the host with the next Acknowledge response. The returned record contains six bytes of general information followed by a sequence of one or more "function set vectors." These vectors identify the Function Sets, and the associated levels and properties, supported by the printer.

Byte 0: X'FF' describes system 370 convention.

Bytes 1–2: Describes the product number (e.g., X'3800').

Byte 3: Describes model number.

Bytes 4–5: Reserved.

Bytes 6–m: Self-identifying Function Set vectors (see below).

The Function Set Vectors take the following format:
Bytes 0-1: Length of the Function Set Vector.
Bytes 2-3: Function Set Identifier.
Bytes 4-5: Function Set Level Identifier.
Byte 6: Function Set Property Identifier.
Byte 7: Function Set Property Data.
Bytes 8-n: Additional Properties, analogous to bytes 6-7 above.

Set Home State

This command causes the printer to return to Home State regardless of the current state. If this command is organized correctly, no errors can result from its execution.

If the printer is already in the Home State, no action is taken.

If the printer is in any resource state (Page Segment State, Overlay State, Font Index State, Font State, or any derivative of these states) the partial resource is deleted before returning to Home State.

Following execution of this command, pages which have been printed and stacked can only be determined from the page counters; i.e., if this command prematurely terminates a page, that page may or may not be printed.

No data is transmitted with this command.

Execute Order Homestate

This command identifies a set of subcommands (orders) for formatting physical pages of data, printing groups of physical pages, and managing the fonts, page segments, and overlays.

Each Execute Order Homestate command consists of a two-byte order code followed by zero or more bytes of parameters.

The following Execute Order Homestate order codes are reserved for compatibility. If received, they may be treated as a No Operation.

X'0B00'
X'F400'

There is only one order per Execute Order Homestate command. These orders follow:

XOH Print Buffered Data Order

Upon issuance of this order, sheets are printed for those pages for which all data to be printed has been transmitted and stored, i.e., buffered, within the printer. Such sheets are printed and stacked in the output hopper prior to sending the Acknowledgement Reply presumably requested with this order.

This order has no effect on buffered pages that are part of an uncompleted buffered sheet, i.e., one side of a duplex sheet, nor does the presence of such pages cause an exception condition. Such pages are neither printed nor discarded.

Following execution of this command, pages which have been successfully printed and stacked can be determined from the page counters returned with the Acknowledge.

XOH Erase Residual Print Data Order

This is a data security and privacy order used to prohibit access to residual print data.

This order causes the printer to first execute a Print Buffered Data order and then make all page, page segment, image and overlay data unrecoverable by any means. This could be done, for example, by clearing all such data to all 1's, all 0's, or to a random pattern.

XOH Erase Residual Font Data Order

This is a data security and privacy order used to prohibit access to residual font data.

This order causes the printer to first execute a Print Buffered Data order and then make all font data (raster and control information) unrecoverable by any means. This could be done, for example, by clearing all such data to all 1's, all 0's, or to a random pattern.

XOH Eject to Front Facing Order

The meaning of this order is dependent on whether the current media is 'cut sheet', i.e., media sheets are unconnected, or continuous form, i.e., media sheets are connected, usually by a perforated strip.

For cut sheet media, this order causes the next received side of data to be printed on the front of a new physical sheet. This is the normal process for simplex mode printing operation using cut sheet media, hence this order only has significance (alters the normal process) when received between the sides of an otherwise duplexed sheet.

For continuous media, this order causes the next received side of data to be printed on a new front facing sheet. A "front facing sheet" is the first sheet to be printed when two sheets of a continuous form are folded so that the printing is facing out.

The order is not cumulative, i.e, consecutive Eject to Front Facing commands produce the same effect as a single command.

XOH Select Input Media Source Order

This order selects the input media source, and, indirectly, the input media, for subsequent physical sheets. This order begins with the physical sheet on which the first copy of the next received page will be printed.

Execute Order Anystate

This command identifies a set of subcommands (orders) which take effect immediately, regardless of the current printer command State.

Each Execute Order Anystate command consists of a two-byte order code followed by zero or more bytes of parameters.

The following Execute Order Anystate order codes are reserved for compatibility. If received, they may be treated as a No Operation.

X'0600'
X'0C00'
X'F100'

There is only one order per Execute Order Anystate command. These orders follow:

XOA Read Font List Order

This order causes the font list record to be placed in the Special Data area of the Acknowledgement presumably requested with this order. The font list record lists all the complete single-byte and double-byte fonts currently resident in the printer.

(A double-byte font is considered to be complete if it has at least one complete section.)

The response to this order is not formulated and returned until all previous commands and/or orders which could affect this response have been processed.

XOA Mark Form Order

This order will cause the printer to mark the current or the next sheet with a device specific "form". Typically, this order will be used in the printing of job separator sheets, error summary sheets, etc.

If the printer is in Page State or any derivative of Page State when this order is received, the form here specified is printed on the current page; otherwise, it is printed on the next received page.

XOA Alternate Offset Stacker Order

This order signals the printer to "jog" the current and subsequent physical sheets. "Jogging" causes these sheets to be stacked in the output hopper with a device specified offset from the previously stacked sheets. The function is cumulative. (An even number of AOS orders, for the same sheet, have the same effect as no AOS order. An odd number of AOS orders have the same effect as a single AOS order.)

If the printer is currently receiving a page, i.e., it is in Page State or any of its derivative states, the "current" sheet is the first sheet (in case of multiple copies) on which that page will be printed. Otherwise, the "current" sheet is the first sheet on which the next received page will be printed.

XOA Discard Buffered Pages Order

This command causes all buffered pages (including any currently being received) to be deleted and the printer to return to Home State regardless of the current state. If this command is syntactically correct, no errors can result from its execution. This command has no effect on completely received resources (fonts, overlays, and page segments).

If the printer is in any resource state (Page Segment State, Overlay State, Font Index State, Font State, or any derivative of these states) the partial resource is deleted before returning to Home State.

Following execution of this command, pages which have been printed and stacked can only be determined from the page counters.

XOA Request Printer Information Order

This order causes from 0 to 246 types of device defined printer information to be placed in the Special Data Area of the presumably requested Acknowledgement Reply. If the ARQ flag was not set on the XOA command containing this order, then this order is equivalent to a No Operation.

The information returned is in any device defined format.

XOA Request Resource List Order

This order causes the Resource List to be placed in the Special Data Area of the Acknowledge Reply presumably requested with this order. This order allows the host to optimally manage the printer resources (fonts, page segments, overlays) by providing a generalized query mechanism.

The response to this order is not formulated and returned until all previous commands and/or orders which could affect the presence or absence of a queried resource have been processed.

Bytes 0–1: RRL Order Code
Byte 2: Requested ordering
    The sequence in which the host requests that the resource list be returned. The printer is not required to return the resource list in this order.
Bytes 3–4: Entry Index
    These bytes are used to index the resource list, i.e., they are the starting entry number for the resource list. These bytes will normally be set to X'0000' on the initial read of the list. If the entire list cannot be read in a single read (it does not all fit in the Special Data Area), then this code is set to the appropriate index value for subsequent read(s).
Bytes 5–end of command: Entry Length, followed by resource type, i.e., font, page segment or overlay, the resource qualities, i.e., main storage, auxiliary storage, etc., and the resource identifier.

The format of the Resource List returned with the Acknowledge is as follows:
Byte 0: Actual ordering
    The ordering sequence for the following list. It need not necessarily match the ordering sequence requested by the host.
Bytes 1–245
    A sequence of one or more individual entries including:
    Byte 1: Entry length.
    Byte 2: Resource type.
    Byte 3: Resource qualifier.
    Byte 4: Resource size indicator

XOA Exception Handling Control Order

This order transfers 5 bytes which specify the actions the printer is to take with respect to the reporting and processing of exception actions.

This control, the Acknowledge Reply (described in "Acknowledgement Reply") and the individual exception codes (described in "Exception Reporting Codes") provide the mechanism for exception handling within the process.

Bytes 0–1: EHC Order Code
Byte 2: Exception Reporting
    Bit 0: Report Undefined Character Check
        A character code can be specified as undefined in its font index entry. An undefined data character in a Write Text command causes an error to be reported back to the host system when this bit is set to '1'. Such errors are "blocked", i.e., not reported back to the host system, when this bit is set to '0'.
    Bit 1: Report Physical Position Data Check
        It is an error to attempt to print off the physical sheet, i.e., off the medium. If this bit is set to '1', such errors will be reported back to the host system. Such errors are "blocked", i.e., not reported back to the host system, when this bit is set to '0'.
        This bit can be ignored by devices which are incapable of detecting such an error.
    Bit 2: Report Logical Position Data Check
        It is an error to attempt to print off the current logical page. The logical page size is defined by the current Load Page Descriptor command. "Current" is specified to indicate that, for example, it is an error to attempt to print off the logical page within an overlay even if that print attempt falls within the logical page of a containing overlay. If this bit is set to '1', such errors will be reported back to the host system. Such errors are "blocked", i.e., not reported back to the host system, when this bit is set to '0'.
    Bits 3–6: Reserved
    Bit 7: Report all Other Exceptions
        If this bit is set to '1', all exceptions other than the ones defined in bits 0-2 above will be reported back to the host system. Such exceptions are "blocked", i.e., not reported back to the host system, when this bit is set to '0'.

Byte 3: Alternate Exception Action (AEA) Control

This byte defines how printer processing is to continue—independent of the exception reporting defined in Byte 2.

A value of X'00' indicates that the printer is to continue processing with the Alternate Exception Action which may be defined by the device.

A value of X'01' indicates that the printer is to continue processing as defined by the contents of Byte 4, below.

Byte 4: Exception Presentation Processing (EPP)

X'00' indicates that, within the limits of the print process, the printer is to delete the page containing the error and all upstream (later received) page data. The next received host command will, presumably, begin the host controlled recovery.

X'01' indicates that, within the limits of the print process, the printer is to print to the point of the error and terminate processing.

X'02' indicates that, within the limits of the print process, the printer is to print to the point of the error and continue processing with the next Write Text Control, Write Image Control, Write Graphics Control, or Write Bar Code Control command.

XOA Set Print Quality Control Order

This order transfer 3 bytes which specify the quality with which all following data is to be presented.

The intent of this subcommand is to allow the specification of levels of "quality" for printer technologies which support more than one such level.

For text data, the intent of this subcommand is to specify the level of quality to be achieved without changing fonts. It is an exception if a device supports multiple text quality levels but cannot change to the requested quality without changing the current font. In such an event, the Alternate Exception Action (under the control of the Exception Handling Control) is to change to a device determined appropriate font.

Bytes 0–1: SPQ Order Code

Byte 2: Print Quality

Quality levels are specified on a relative scale, from 1 (lowest) to 254 (highest). The printer uses a device defined algorithm to map its supported quality levels to the specified levels. This mapping may vary by data type, i.e., there may be different mappings for text, image, graphics, and bar code.

For example, if a printer supports three levels of quality for text, it could map levels 1–85 to its first text level, 86–170 to its second text level, and 171–254 to its third text level. If only one level of quality is supported for image, then images are printed at this quality level for any specified value from 1–255.

Byte 3: Print Modifier, e.g., bold print.

Load Copy Control

The Load Copy Control command controls the production of output sides from subsequently received input logical pages. The command remains in effect until the next LCC is received. This command transmits 2 or more bytes of data to the printer. This information is organized as one or more "groups" which contain the controls for producing output sides from input pages.

"Simplex" refers to printing on only the front of each physical sheet.

"Normal duplex" refers to printing on both sides of each physical sheet. The front side is the first side printed. The sheet is turned over by rotating it above the Y axis, however, the physical and logical page coordinate axes are maintained at the same location and in the same direction for both sides. This operation results in the top of both sides along the same edge.

"Tumble duplex" also refers to printing on both sides of each physical sheet. The front side is the first side printed. This mode differs, however, from normal duplex printing in that after the sheet is turned over by rotating about the Y axis, the entire physical and logical coordinate system is rotated 180-degrees by the printer and moved to the diagonally opposite corner of the sheet. This operation results in the foot of one side and the top of the other side along the same edge.

When simplex groups are specified, there is one output side per sheet and a single copy group controls the production of that sheet. When duplex groups are specified, there are two output sides per sheet and each side is controlled by a separate copy group.

Thus, each page received will be processed once for each simplex group defined or once for each pair of duplex groups defined. A given group will produce one or more identical sides of output, this number being determined by the "Number of Identical Copies" parameter specified with each group definition. The number of output sides produced by each received page is therefore the sum of the "Number of Identical Copies" parameters from the groups associated with that logical page.

Note that the mixing of simplex and duplex copies is an error. All copy groups defined by an occurrence of this command are either simplex or duplex as defined by the Copy Modification Keyword explained below.

For duplex operation an even number of copy groups must be specified. The first copy group in each pair contains the controls for the "front" side of the duplex sheet. The second copy group in each pair contains the controls for the "back" side of the duplex sheet. The "Number of Identical Copies" control (byte 1) must therefore be identical for both members of such a pair of copy groups. Thus, it is an error if byte 1 of this command (see below) specifies a different number of copies for the front and the back sides of a duplex sheet. The type of duplex specified, i.e., normal or tumble, must also be identical for both members of such a pair of copy groups. In other words, it is an error to specify a mix of normal and tumble duplex for the same sheet.

An entry for a group of identical copies consists of from 2 to n bytes of data as described on the following pages.

Byte 0: Entry Byte Count

A binary number indicating a count of the number of bytes in this group definition entry. The value includes the count byte itself. Values range from 2 to 36 inclusive.

Byte 1: Number of Identical Copies

A binary number indicating the number of identical copies to be printed for each page in this group. The values range between 1 and 255 inclusive.

Bytes 2–n: Copy Modification Keyword List

This is an optional copy modification keyword list. Its modification parameters apply to all copies printed for this group.

The list is made up of two-byte controls: the first byte of the pair is the keyword and the second byte is the associated parameter. These two-byte controls may appear in any order within the list.

Unspecified parameters in any Copy Modification Keyword List are set to the default values listed below.

The valid keywords and parameters are as follows:

X'C1'—Simplex/Duplex Operation

The one-byte parameter identifies the operation mode:

X'00' indicates simplex printing
X'01' indicates normal duplex printing
X'02' indicates tumble duplex printing Note that in either of the duplex modes, input pages should be received in pairs. The first page of each pair being the "front", and the second page being the "back" of the sheet. If a Load Copy Control is received between the sides of a duplex sheet, the printer will automatically insert the equivalent of an "Eject to Front Facing" command following the most recently received page.

X'D1'—Suppression

The one-byte parameter is the suppression from a BS ... ES pair.

If this parameter specifies a nonexistent suppression number, it is ignored.

X'E1'—Medium Overlay

The one-byte parameter is the overlay identifier from a "Begin Overlay" command.

When a Load Copy Control reference causes a medium overlay to be placed on a copy, the logical page reference corner of the overlay is positioned at X=0, Y=0; i.e., at the physical medium origin.

Overlays specified in a Load Copy Control command need not be loaded at the printer at the time this command is received. However, an exception exists if a specified overlay is not loaded at the printer by the time it is to be placed on a copy.

The maximum number of keyword parameter pairs that may be specified per copy group is: one for simplex/duplex specification (X'C1'), device limit for suppressions (X'D1'), and medium overlays (X'E1').

The group definitions specified on a Load Copy Control command apply to all subsequent pages received from the host system. When another Load Copy Control command is received, its group definition(s) completely replace any existing group definitions within the printer.

The following are the default values for Load Copy Control parameters. These parameters are used unless explicitly overridden by a LCC command.

One copy of each page, simplex printing, no overlays, no suppressions.

Load Page Position

This command defines the position on the physical sheet of paper where the logical page is to be placed. That position is expressed in terms of the L-units in effect at the time the Load Page Position command is received.

The Load Page Position command transmits 10 bytes of data to the printer.

Byte 0: Reserved
Bytes 1-3: X Coordinate
A signed binary number specifying, in L-units, the X coordinate of the logical page reference corner The value may range from minus 32,768 to plus 32,767.
Byte 4: Reserved
Bytes 5-7: Y Coordinate
A signed binary number specifying, in L-units, the Y coordinate of the logical page reference corner. The value may range from minus 32,768 to plus 32,767.
Bytes 8-9: Reserved
Note, printing only occurs where the logical page coincides with the printable area of the physical page. Thus, for example, data on the logical page which is positioned beyond the edges of the available physical page of paper cannot be printed.
The default values for X and Y are assigned by the device. These values are set at IML time and remain in effect until they are replaced by a valid Load Page Position command.

Acknowledgement Reply

The Acknowledgement Reply is used by the printer to return device status, sense, and additionally requested information back to the host system.

The Acknowledge data is used by the host program to maintain control of the printing application and to initiate exception recovery actions when required. Parallel processing in the printer may result in the detection of multiple "simultaneous" errors which may be queued in the printer. It is preferred, as a result, that host data retransmission be initiated only after a synchronizing command, i.e., XOH Print Buffered Data or XOA Discard Buffered Pages, has been successfully ACKed.

An Acknowledgement is sent by the printer:
Whenever the Acknowledgement Required (ARQ) flag of a received command header is set to a '1'.
Whenever a command stream exception or device exception is detected and a negative response must be sent.

The Acknowledge Reply is identical in format to all other commands.

The two byte Acknowledge "Command ID" is X'D6FF'.

Bit 0 of the Flag byte (byte 4) is Reserved and should be set to '0'. If a Correlation Number has been supplied for a command that results in a NACK, and if the printer can identify this command, such a NACK must have its Correlation Number Present bit (Flag bit 1) set to '1' and must contain the matching Correlation number in the two bytes following the flag byte. Otherwise, the Correlation Number Present bit for the NACK should be set to '0' and the ACK or NACK data field immediately follows the Flag byte.

Flag bits 2-7 are Reserved.

The format of the Acknowledge Reply data field is described below. The complete Acknowledge Reply "command" is limited to 256 bytes. Thus, if there is a 5 byte command header (no Correlation Number), the data field may be up to 251 bytes long. If a Correlation Number is present in the header, the data field may be up to 249 bytes long.

Byte 0: Acknowledgement Type
A one-byte field that identifies the type of this Acknowledgement command and the contents (if any) of the Special Data Area in Bytes 5–250 of this command's data field.

Bytes 1–4: Output Station Counters

This area contains the current values of the two, 2-byte output station counters maintained within the printer.

Bytes 1–2: Page Counter

This counter identifies how many pages (Begin Page . . . End Page) have been successfully deposited in the output hopper. Successfully deposited means that the sheet on which the page is composed has been deposited at the output station and all pages on the sheet are either error free or they are printed because the Exception Presentation Processing (EPP) byte of the XOA Exception Handling Control has specified "print to error".

This counter is incremented when the sheet containing the last copy of a page is deposited in the output hopper.

Bytes 3–4: Copy Counter

This counter identifies how many copies of a page have been deposited at the output hopper but have not been accounted for by the Page Counter. This counter allows the host to track the number of copies printed for multiple copy pages. The Copy Counter is incremented by one for each sheet (the assumption is that only one copy of a page is placed on a sheet). It is incremented when a sheet is successfully deposited at the output hopper. Again successfully deposited means that the sheet on which the page is composed has been deposited at the output station and all pages on the sheet are either error free or they are printed because the Exception Presentation Processing (EPP) byte of the XOA Exception Handling Control has specified "print to error".

It is reset to zero when the Page Counter is incremented. This counter is also reset to zero after the Acknowledge of a Print Buffered Data or Discard Buffered Data order is returned.

Bytes 5–250: Special Data Area

This area contains from 0 to 246 bytes of additional data (known as the Special Data) as requested by the host system and as defined by the Acknowledgement Type (Byte 0 above).

Note that the amount of Special Data returned to the host system with this command can be determined from the value in the two byte length field of the Acknowledge header.

The Special Data area is loaded with the appropriate data when either of the following circumstances occurs:

1. Receipt of any of the following information request commands (with an ARQ):
   A. Sense Type and Model Command
   B. XOA Request Printer Information
   C. XOA Read Font List
   D. XOA Request Resource List
2. Occurrence of an exception. (The Special Data area is loaded with the sense bytes as described under "Negative Acknowledgement", below.

Note that unless an ARQ (Acknowledgement Required—bit 0 of flag byte in command header) is received with the commands listed in item 1 above, then these commands are effectively NOPs. On exception, the Special Data area is loaded with the Sense Bytes.

The contents of the Special Data area for the various Acknowledgement Types (defined in Byte 0 of this command), are as described below.

Positive Responses with no Special Data (Type X'00')

For positive responses to a command stream with no Special Data present, this field does not exist and only the first 5 bytes of the Acknowledgement command are sent to the host system.

Sense Type and Model (Type X'01')

For positive responses to a Sense Type and Model command, the special data area contains the machine identification record as described in "Sense Type and Model".

Request Printer Information (Type X'02')

For positive responses following a Request Printer Information order on an Execute Order Anystate command, the special data area contains the Request Printer Information Data described in "XOA Request Printer Information".

Read Font List (Type X'03')

For positive responses following a Read Font List order on an Execute Order Anystate command, the special data area contains the font list data as described in "XOA Read Font List".

Request Resource List (Type X'04')

For positive responses following a Request Resource List Order on an Execute Order Anystate command, the special data area contains the font list data as described in "XOA Request Resource List".

Negative Acknowledgement, or "NACK" (Types X'80' and X'81')

For all negative responses, the special data area contains as many sense bytes as the device wishes to support. Sense bytes are intended to identify the exception and, possibly, the suggested recovery action. Three sense bytes are registered for each identified error. A listing of these byte values is found in "Exception Reporting Codes". If sense bytes are returned by the device, the registered values must be used as the basic definition of the exception. Additional sense bytes, defined by the device, may also be returned.

Negative Acknowledgement type X'81' (Cancel Print Job) is the result of printer operator action, e.g., pressing the "CANCEL" button.

PRESENTATION TEXT FUNCTION SET

Write Text Control

The Write Text Control command is sent to the printer to indicate that the command sequence that follows is directed to a text presentation block area on the current page, overlay or page segment that is being constructed by the device. The parameters of this command define the size, placement and orientation of the text block and establish the initial conditions for interpreting the text data.

Upon receiving this command, the printer enters the appropriate text block state, saves the current text states, then initializes control for processing text block data that is sent in subsequent Write Text commands. The End command received in text block state, terminates the processing of block data and causes the text state to be restored to their previous values.

Note that text controls within the text block reference the I and B axes defined by this command (and possibly redefined within the block).

Positive acknowledgement of text block commands in Overlay State or Page Segment State means that general syntax and validity checks have been made and the command, or command sequence, has been accepted for processing. Exception conditions that are detected when the data is included on the page are reported asynchronously, when the exception is enabled.

The Write Text Control data is made up of three consecutive structured fields: Text Area Position Control (TAP), Text Output Control (TOC) and Presentation Descriptor (PTD). Command structure is as follows:

The first five bytes (length, ID, and flags) follow the standard command structure previously described.

Bytes 5–6 (TAP bytes 0–1): "TAP LL", defines the length of the Text Area Position control.

Bytes 7–8 (TAP bytes 2–3): "TAP ID", are the two byte identifier of the Text Area Position.

The next several bytes describe the parameters of the Text Area Position and are described in detail below.

TOC bytes 0–1: "TOC LL", defines the length of the Text Output Control.

TOC bytes 2–3: "TOC ID", are the two byte identifier of the Text Output Control.

PTD bytes 0–1: "PTD LL", defines the length of the Text Data Descriptor.

PTD bytes 2–3: "PID ID", defines the Presentation Text Data Descriptor.

Text Area Position

This data structured field defines the position and orientation of the Text Object Area relative to a reference coordinate system. It is a REQUIRED data field in the Write Text Control command.

TAP bytes 4–7: Object Area Origin
> Two two-byte binary numbers that specify the position of the top left corner of the text output area. These numbers represent either an X,Y or I,B coordinate position depending on the value specified in byte 10, Reference System, below. All values of X and Y or I and B are permitted.

TAP bytes 8–9: Output Area Orientation
> This parameter specifies the orientation of the text output area, i.e., the Xp axis of the text block, in terms of an angle measured clockwise from the X or I axis of the reference coordinate system. The effect of this parameter is to rotate the output space defined for the area around the origin position specified in bytes 4–7 above. Text block objects presented in the area are aligned such that the positive Xp axis of the object is parallel to, and in the same direction as, the positive X axis of the area.
>
> The Output Area Orientation is specified using the same syntax as that used for specifying the Inline Sequence direction for text, however this parameter is independent of the text orientation. The acceptable values in degrees are: 0 (X'0000'), 90 (X'2D00'), 180 (X'5A00'), and 270 (X'8700').

TAP byte 10: Reference System
> This parameter defines the reference coordinate system used to position the output area on the page. The valid values are:
> X'00' = Text (absolute I, absolute B),
> X'20' = Text (absolute I, relative B),
> X'40' = Text (relative I, absolute B),
> X'60' = Text (relative I, relative B), and
> X'80' = Page (absolute X, absolute Y).

Text Output Control

This data structured field specifies the mapping option for the presentation text object. It is an elective data field in the Write Text Control command. If this field is omitted, mapping option X'30' applies where the offset origin position is defined to be the same as the area origin.

TOC byte 4: Area Unit of Measure
> X'00' indicates the unit-base for x and y dimensions is inches; X'01' indicates the unit base is centimeters.

TOC bytes 5–6: L Units/unit-base
> Bytes 5–6 contain a binary parameter expressing the number of units per unit base used in specifying distances in the area X or Y direction. For example, if the base is X'00' and this value is 1440, then L Units = 1440 units per inch.

TOC bytes 7–8: X-Extent of Area
> The X dimension (width) of the area in L-units. The valid range is 1 to 32,767. This is the length of the X axis of the output area.

TOC bytes 9–10: Y-Extent of Area
> The Y dimension (height) of the area in L-units. The valid range is 1 to 32,767. This is the length of the Y axis of the output area.

TOC byte 11: Object Mapping Option

X'10' Scale to Fit (Symmetrical)

The center of the text object is mapped to the center of the output area and the text data is scaled so that object fits entirely within the output area at the closest maximum scale. This option ensures that all of the data in the block will be presented in the output area at the greatest scale possible. The physical size of the block, however, may be different then that specified in the Text Data Descriptor if the output area size is different from the physical size of the object.

If the font technology used in the product does not support scaling of character data and the text object size at current scale is large than the output area, an exception condition exists. There is no alternate action for this condition. Page printing resumes as specified by the Exception Presentation Processing parameter (EPP) set by the Exception Handling Control order. See XOA (ECH).

X'20' Center and Trim

The center of the text object is mapped to the center of the output area and the object is presented at the specified scale. Any text data that goes outside the output area is trimmed (clipped) to the area boundary.

X'30' Position and Trim

The origin of the text block is mapped to a specified point in the output area and presented at the specified scale. Text data that goes outside the output area is trimmed at the area boundary.

TOC bytes 12–13: X-offset
> The 'x' displacement of the text block origin from the area origin in L units of the area. This parameter must be provided if the mapping option is X'30' and the origin of the block is different from the origin of the area.

TOC bytes 14-15: Y-offset

The 'y' displacement of the text block origin from the area origin in L units of the area. This parameter must be provided if the mapping option is X'30' and the origin of the block is different from the origin of the area.

All area mapping operations, except Scale-to-Fit, are windowing operations on the data when the object presentation space goes beyond the boundary of the area as illustrated.

This can result in a perceived loss of information to an end user. If this result is not desirable, then positioning of the data should be done via the object positioning control only; the area mapping options should not be used.

It should be further noted, however, that the trim never occurs in area mapping operations where the object space rectangle lies entirely within the output area.

Presentation Text Data Descriptor

This is a required data structured field in the Write Text Control command. It specifies the parameters that define the text object size and initial text default conditions.

PTD byte 4: Xp Unit of Measure

X'00' indicates the unit base of measure for the Xp dimension of the text block is inches; X'01' indicates the unit base is centimeters.

byte 5: Yp Unit of Measure

X'00' indicates the unit base of measure for the Yp dimension of the text block is inches; X'01' indicates the unit base is centimeters. Yp units must equal Xp units.

PTD bytes 6-7: Xp L Units/unit-base

Bytes 6-7 contain a binary parameter expressing the number of units per unit-base used in specifying the Xp-extent of the text block. For example, if the base is X'00' and this parameter is 1440, then L Units—1440 units per inch.

PTD bytes 8-9: Yp L Units/inch

Bytes 8-9 contain a binary parameter expressing the number of units per unit-base used in specifying the Yp-extent of the text block. Yp L units must equal Xp L units.

PTD bytes 10-11: Xp-Extent of Text Block

The Xp dimension (width) of the text block in Xp L units. The valid range is 1 to 32,767. This is the length of the X axis of the block.

PTD bytes 12-13: Yp-Extent of Text Block

The Yp dimension (height) of the text block in Yp L units. The valid range is 1 to 32,767. This is the length of the Y axis of the block.

PTD bytes 14-15: Presentation Text Flags

These bytes contain information flags that characterize the data within the text object. They are defined in the PTOCA specification. They have no processing semantics for printers.

Initial Text Default Conditions

This portion of the Presentation Text Data Descriptor contains zero or more self-describing keyword triplets that set the initial conditions for interpreting text within the object.

Write Text

The Write Text command transmits a data record of zero or more bytes of text data and/or zero or more multi-byte controls imbedded within the text. Controls may be imbedded anywhere within the text data.

X'2BD3' is the two byte escape sequence introducer identifying the beginning of an imbedded control sequence.

COUNT is a one-byte length of the number of bytes in this imbedded control sequence, excluding the above introducer but including the COUNT byte itself.

TYPE is the one-byte identifier of the text control operands are the operand bytes (if any) for the given imbedded control.

FIGS. 6A-6C identify and summarize the valid imbedded text controls.

Imbedded Control Sequences

A contiguous "chain" of imbedded control sequences may appear in the Write Text data. Such a chain of imbedded control sequences is detected by odd-numbered type codes. All have one added to their normal type code value (except for the last type code in the chain).

In the case of chained imbedded control sequences, only the first imbedded control sequence contains the X'2BD3' introducer. All other imbedded control sequences in the chain begin with the X'LL' byte. The end of such chained imbedded control sequences is identified by an even-numbered type code in the last control sequence in the chain.

Spanned Imbedded Control Sequences

Note that the data and imbedded controls received may span multiple Write Text commands. That is, a Write Text command may end in the middle of an embedded control sequence or a double-byte character code. However, in this event, it is an error if any commands other than Execute Order Anystate, No Operation, Set Home State, or Sense Type and Model are received before the next Write Text command.

Errors in Imbedded Control Sequences

When invalid text controls are received in Page State or any derivative state of Page State, the printer will immediately notify the host (assuming error reporting is enabled) via a Negative Acknowledgement (NACK). See "Acknowledgement Reply".

When invalid text controls are received in Page Segment State, Overlay State, or any derivative of these states, such errors need not be reported (assuming reporting is enabled) until the given segment or overlay is included on a page.

Parameter Range Checking

In general, the process does not require range checking for controls which affect the print position. For example, if such controls contain a parameter which eventually results in an attempt by the printer to print off the logical page, then an exception exists only at that time.

Print Character Processing

Ic and Bc are used to denote that I and B coordinates of the current print position. On each Begin Page command, Ic and Bc are initialized to the Ii and Bi values specified by the current Load Page Description values.

Each character in a string of Write Text data normally causes a character pattern to be placed on the page and the Ic coordinate of the current print position to be increased. Prior to actually placing the character on the page, the Ic coordinate is first increased by the number of L-units specified by the current value of the Set Inter-Character Increment text control, if this character comes immediately after a printing character. The character pattern is then placed with the character reference point coincident with the revised print position. The current print position is then incremented by the addition of the character increment value to the Ic.

As each text character is placed, the current print position is moved in the positive inline direction. Print positions point between pels. The pel associated with a given print position is the pel which follows that print position in the positive inline and the positive baseline directions.

This situation permits the printing "n" characters, each having a fixed character increment of "i", on a logical page whose I-Extent is "n" times "i". For example, if "n" is 100 characters and "i" is 0.1 inch, i.e., 10-pitch, all 100 characters will fit on a logical page with an I-Extent of 10.00 inches. In this case, the 100th character just fits within the page boundary, while the automatic character increment forces the current print position (Ic) to move onto the boundary.

Throughout the above process, the current baseline coordinate (Bc) remains unchanged. Each character's relationship to the baseline is defined by the Baseline Offset parameter of its font control record. Each character's reference point, which lies along the character baseline defined by the Baseline Offset, is made coincident with Ic,Bc when a character is placed on a page.

Load Font Equivalence

The Load Font Equivalence command maps GLOBAL to LOCAL font identifiers within each of a sequence of repeating groups.

The fonts referred to in this command need not necessarily exist within the printer when the command is received.

This command transmits a list of 1 or more 16 byte entries.

Byte 0: Local (one byte) Font Identifier
  A one-byte binary number that is intended to equate to a font identifier used within Text, Graphics, or Bar Code data. Any value is valid.
  For a given data type, this value must be unique within the equivalence list, i.e., for a given data type, there can be only one global id for each local id.

Bytes 1-2: Loaded Font Identifier
  A two-byte binary number that provides a unique quasi-global 'nickname' for loaded fonts. "Quasi-global is simply intended to indicate that there is a one to one mapping of Loaded Font Identifiers to global fonts.
  This identifier is specified in bytes 0-1 of the Load Font Control command and bytes 15-16 of the Load Symbol Set command.
  Any value in the range X'0001-7EFF' is valid.
  This parameter value need not be unique within the equivalence list, i.e., a Loaded Font Identifier may be mapped to more than one set of other identifiers. (Usually, this means that several local identifiers are mapped to a single Loaded Font Identifier.)

Bytes 3-4: Reserved for future use.
Bytes 5-6: Character Set ID
  This is the global character set identifier.
  Devices which support only coded fonts may ignore the contents of this field.
Bytes 7-8: Code Page ID
  This is the global code page identifier.
  Devices which support only coded fonts may ignore the contents of this field.
Bytes 9-10: Font ID
  This is the global font (style) identifier.
  Devices which support only coded fonts may ignore the contents of this field.
Bytes 11-12: Uniform Character Increment
  This is the uniform character increment.
  If a Load Font Control command for the coded font specified in bytes 1-2 is received, the character increment(s) specified in that LFC (and/or its matching LFI command) supercedes this value.
  If no Load Font Control command for the coded font specified in bytes 1-2 is received, this uniform character increment is superceded by the contents of the Proportional Increment Coefficient Table if that table (identified in byte 11, below) exists in the printer when the font is used.
  Devices which support only coded fonts may ignore the contents of this field.
Byte 13: Proportional Increment Coefficient Table
  The content of this byte is assumed to be an identifier of a Proportional Increment Coefficient Table. If this table exists within the printer when the font is used then the table values specify the character increments for the (presumed) PSM font identified in bytes 9-10, above.
  If a Load Font Control command for the coded font specified in bytes 1-2 is received, the character increment(s) specified in that LFC (and/or its matching LFI command) supercedes the values here referenced.
  Devices which support only coded fonts may ignore the contents of this field.
Byte 14: Font Attributes
  Bits 0-2: Data Type
    b'000'=Text, i.e., the local font ID (Byte 0) is the identifer of this font with Text data.
    b'001'=Graphics, i.e., the local font ID (Byte 0) is the identifier of this font within Graphics data.
    b'010'=Bar Code, i.e., the local font ID (Byte 0) is the identifier of this font within Bar Code data.
    B'011-111'=Reserved.
  Bits 0-6: Reserved
  Bit 7: Double Wide
Byte 15: Reserved
  The font equivalences for a given page are those which were in effect when the Begin Page command was processed. The font equivalences for a given overlay are those which were in effect when the Begin Overlay command was processed. Thus, when an overlay definition is actually processed (via an Include Overlay command), its associated font equivalences may differ from the current page font equivalences. This difference in Font Equivalence records may also apply to each level of nesting of one overlay within another overlay.
  Each Load Font Equivalence command creates a new Font Equivalence Record which completely replaces the previously specified record for the corresponding Page State or Overlay State (and the associated level of nesting).

There is no specified default Font Equivalence Record.

Load Equivalence (Elective Command)

This command permits physical values imbedded in data stored within the printer to be referenced externally using different values. For example, the Internal Suppression value of X'02' may be referenced externally on a Load Copy Control as a X'06' provided that an appropriate Load Equivalence command was previously received.

This mapping remains in effect until another Load Equivalence command is received, at which time its values will totally replace this mapping.

This command consists of a two-byte parameter followed by a list of 0 to 127 four-byte entries.

Byte 0-1: Mapping Type
  The only valid value is X'0100' which indicates Suppression Equivalence mapping. All other values are reserved for future use.

Bytes 2-3, 6-7, . . . (First 2 bytes of a list entry): Internal Value
  This is the internal value of the store parameter (the value used in the "Begin Suppression" and "End Suppression" commands). The valid values range from 1to 127.
  This parameter must be unique within the Load Equivalence list, i.e., each internal value may map to only one external value.

Bytes 4-5, 8-9, . . . (Second 2 bytes of a list entry): External Value
  This parameter specifies the external value (used in the "Load Copy Control command) by which the internal value may be referenced. The valid values range from 1 to 127.
  This parameter need not be unique within the Load Equivalence list, i.e., several internal values may map to the same external value.

This command is not required in order to use the suppression function. If a LCC refers to a suppression identifier which has not been specified as an external value in a LE command (which may be because no LE has been received), then the identifier "maps" only to itself, i.e., the requested suppression is considered to be a direct reference to an "internal value" suppression identifier used in a 'Begin Suppression . . . End Suppression' pair.

IMAGE FUNCTION SET

Write Image Control

The Write Image Control command is sent to the printer to indicate that the command sequence that follows is directed to a Image presentation block area on the current page, overlay or page segment that is being constructed by the device. The parameters of this command define the input and output size of the image array and the necessary information for interpreting the NCI raster input data. Selected parameter settings in this command may also request operations to be performed on the input image data by the device prior to presentation.

When the Write Image Control command is received in Page State, all parameter values are checked for validity. When the command is received in Overlay State or Page Segment State, all parameter values except those used to position the image, bytes 17 through 23, are validated. The placement parameters are verified at the time the overlay or page segment is included on a page.

If the parameters are not within the valid ranges, or if the image is found to extend off the page, an exception condition exists.

OUTPUT IMAGE SIZE

Bytes 0-3 specify the size of the image block output area on the logical page, overlay or page segment being constructed by the printer.

The output block size may be less than, equal to or greater than the size of the source image data to be presented. If the block size is less, the source data is truncated to match the output specification. If the output size is equal to the input size, all pels are presented. If the output block size is greater than the source image size, the source image data is replicated then truncated to fill the pels in the output area.

Bytes 0-1: Target Pel Count
  A binary number indicating the number of pels in each scan line of the target image area. The valid range is from 1 to 32,767.

Bytes 2-3: Target Scan Count
  A binary number indicating the height of the target image rectangle, expressed as a count of the number of scan lines in the image. The valid range is from 1 to 32,767.

The image output control of the process supports presentation of full images or partial images. A product with limited store may constrain the size of images that may be replicated in the output block area to 32×32; the standard cell size used for computer program generated images.

SOURCE IMAGE SIZE

Bytes 4-7 describe the size of the source image data array in canonical form.

Bytes 4-5: Source Pel Count
  A binary number indicating the number of pels in each scan line of the input source image, prior to scaling or magnification. The valid range is from 1 to 32,767.

Bytes 6-7: Source Scan Count
  A binary number indicating the height of the source image rectangle, expressed as the number of scan lines in the image, prior to scaling or magnification. The valid range is from 1 to 32,767.

SOURCE IMAGE DATA FORMAT

Bytes 8 and 9 describe the format of the image input data that is transmitted to the printer in subsequent Write Image commands.

Byte 8: Compression Algorithm Identifier
  Only X'00' is allowed, indicating no image data compression. Future values will indicate the decompression algorithms utilized.

Byte 9: Pel Format Identifier
  Only X'00' is allowed, indicating that the image pel data is bi-level encoded. Bits with a value of 1 identify a toned pel; bits with a value of 0 identify an untoned pel. Future values will indicate other pel encodings.

MAGNIFICATION FACTORS

Bytes 10 and 11 specify the magnification factors. Magnification is a simple form of scaling whereby each pel in the input image is repeated in either the Scan Line or Scan Line Sequence image direction, or in both directions prior to mapping the image to the output area.

Byte 10: Scan Line Magnification Factor
  Only two values are valid:
  X'01' for no magnification, or
  X'02' to double the number of pels in each scan line by repeating each source pel.

Byte 11: Scan Line Sequence Magnification Factor
  Only two values are valid:
  X'01' for no magnification, or
  X'02' to double the number of scan lines, i.e., each scan line is printed twice.

IMAGE OUTPUT ORIENTATION:

Bytes 12-15 define the output orientation of the image block on the page.

Bytes 12-13: Scan Line Direction
  This is the direction in which pels are added when creating an image scan line. (It is the inline direction equivalent for image.)
  The format of this two-byte parameter is analogous to that of the Set Text Orientation control in the Write Text command, however, they are independent; i.e., the specification of Scan Line direction has no effect on the direction of the I or B axes and vice versa.

Bytes 14-15: Scan Line Sequence Direction
  This is the direction in which successive scan lines are added when creating the image rectangle. (It is the baseline direction equivalent for image.)
  The format of this two-byte parameter is analogous to that of the Set Text Orientation control in the Write Text command (see "Write Text"), however, they are independent; i.e., the specification of Scan Line Sequence direction has no effect on the direction of the I or B axes and vice versa. The scan line sequence direction must be +90 degrees from the scan line direction.

IMAGE OUTPUT LOCATION

Bytes 16-23 define the output location of the image block on the page.

Byte 16: Coordinate Definition
  The first pel Location parameters are specified as either "absolute" or "relative" with respect to either the I,B or the X,Y coordinates. "Absolute" means that the first pel Location parameters contain page coordinate values for the first pel location of the image. "Relative" means that the value of the first pel Location parameters must be added to Ic and/or Bc in order to obtain the first pel location of the image. Thus the Coordinate Definition field identifies the type of information to be found in the first pel Location parameters that follow.
  The valid values for this parameter are:
  X'00'=absolute I and B,
  X'20'=absolute I and relative B,
  X'40'=relative I and absolute B,
  X'60'=relative I and B, and
  X'80'=absolute X and Y.

Bytes 17 ∝ 19: First pel Location (X or I Direction)
  This two's complement three-byte binary number identifies the X or I location for the first pel of the following Write Image data. Its value specifies the number of L-units in the X or I direction (as specified by the Coordinate Definition byte above).
  Note that image printing has no effect on the current text printing position (Ic,bc) coordinates.

Byte 20: Reserved

Bytes 21-22: First pel Location (Y or B Direction)
  This two's complement three-byte binary number identifies the Y or B location for the first pel of the following Write Image data. Its value specifies the number of L-units in the Y or B direction (as specified by the Coordinate Definition byte above).
  Note that image printing has no effect on the current text printing position (Ic,Bc) coordinates.

IMAGE COLOR

Bytes 24-25: Color Identifier
  A two byte identifier of the presentation color for the image. The color IDs are the same as those for Text and Graphics. Note, however, that the color for each data type is independently controlled.

Write Image

The Write Image command transmits a block of image data to the printer.

A sequence of one or more Write Image commands follows the Write Image Control command and is terminated by an End command.

The total number of bits of image received is the product of the number of source scan lines times the length (in pels) of each scan line, i.e., the product of:
the scan line pel length
  (Bytes 4-5 of the Write Image Control command)
and the scan line count
  (Bytes 6-7 of the Write Image Control command)

It is an error if the rounded up quotient of this product divided by 8 is not equal to the rounded up quotient of the number of bits received divided by 8, i.e., if the expected bytes are not equal to the received bytes.

GRAPHICS FUNCTION SET

Write Graphics Control

The Write Graphics Control is sent to the printer to indicate that the command sequence that follows is directed to a graphics presentation block area on the current page, overlay or page segment that is being constructed by the device. The parameters of this command define the size, placement and orientation of the graphics block and establish the initial conditions for interpreting the graphic data.

Upon receiving this command, the printer enters the appropriate graphics block state, then initializes control for processing graphic picture segments that are sent in subsequent Write Graphics commands. The End command received in graphic block state, terminates the processing of graphic data.

Positive acknowledgement of graphic block commands in Overlay State or Page Segment State means that general syntax and validity checks have been made and the command, or command sequence, has been accepted for processing. Exception conditions that are detected when the data is included on the page are reported asynchronously, when exception reporting is enabled.

The Write Graphics Control data is made up of three consecutive structured fields. Graphic Area Position Control (GAP), Graphic Output Control (GOC) and Graphic Data Descriptor (GDD). The format of this command is:

The first five bytes ("WGC LL", "WGC ID", "Flags") are the standard process command header.

"GAP LL" is the two byte length of the Graphic Area Position control portion of this command's data.

"GAP ID" is the two byte identifier of the Graphic Area Position structured field.

"GOC LL" is the two byte length of the Graphic Output Control portion of this command's data.

"GOC ID" is the two byte identifier of the Graphic Output Control structured field.

"GDD LL" is the two byte length of the Graphic Data Descriptor portion of this command's data.

"GDD ID" is the two byte identifier of the Graphic Data Descriptor structured field.

Graphic Area Position

The Graphic Area Position (GAP) is a structured field that defines the position and orientation of the Graphic Object Area relative to a reference coordinate system. It is a required data field in the Write Graphics Control command.

GAP bytes 4–7: Object Area Origin
  Two two-byte binary numbers that specify the position of the top left corner of the graphic output area. These numbers represent either an X,Y, or I,B coordinate position depending on the value specified in byte 10, Reference System, below. All values of X and Y or I and B are permitted.

GAP bytes 8–9: Output Area Orientation
  This parameter specifies the orientation of the graphics output area, i.e., the X axis of the graphics block, in terms of an angle measured clockwise from the X or I axis of the reference coordinate system. The effect of this parameter is to rotate the output space defined for the area around the origin position specified in bytes 4–7 above. Graphic pictures presented in the area are always aligned such that the positive x-axis of the GPS is parallel to, and in the same direction as, the positive X or positive I axis of the area.

The Output Area Orientation is specified using the same syntax as that used for specifying the Inline Sequence Direction for text, however this parameter is independent of the text orientation. The acceptable values in degrees are: 0 (X'0000'), 90 (X'2D00'), 180 (X'5A00') and 270 (X'8700').

GAP byte 10: Reference System
  This parameter defines the reference coordinate system used to position the output area on the page. The valid values are:
   X'00' = Text (absolute I, absolute B),
   X'20' = Text (absolute I, relative B),
   X'40' = Text (relative I, absolute B),
   X'60' = Text (relative I, relative B), and
   X'80' = Page (absolute X, absolute Y).

Graphic Output Control

The Graphic Output Control is a structured field that specifies the mapping option for the graphics object. It is an elective data field in the Write Graphics Control command. If this field is omitted, mapping option X'30' applies where the offset origin position is defined to be the same as the area origin.

GOC byte 4: Unit-base
  X'00' indicates the unit-base for X and Y dimension is inches; X'01' indicates the unit-base is centimeters.

GOC bytes 5–6: L Units/unit-base
  Bytes 5–6 contain a binary parameter expressing the number of units per unit base used in specifying distances in the area X or Y direction. For example, if the unit base is inches and this value is 1440, then L Units = 1440 units per inch.

GOC bytes 7–8: X-Extent of Area
  The X dimension (width) of the area in L-units. The valid range is 1 to 32,767. This is the length of the X axis of the graphics block.

GOC bytes 9–10: Y-Extent of Area
  The Y dimension (height) of the area in L-units. The valid range is 1 to 32,767. This is the length of the Y axis of the graphics block.

GOC byte 11: Object Mapping Option

X'10' Scale to Fit (Symmetrical)

The center of the view rectangle is mapped to the center of the output area and the graphic data is scaled so that picture fits entirely within the output area at the closest maximum scale. This option ensures that all of the data in the window will be presented in the output area at the greatest scale possible. The physical size of the picture, however, may be different from that specified by L (GVS) if the output area size is different from the physical size of the view window.

X'20' Center and Trim

The center of the view rectangle is mapped to the center of the output area and the graphic data is presented at the specified scale. Any picture data that goes outside the output area is trimmed (clipped) to the area boundary.

X'30' Position and Trim

The upper left hand corner of the graphic view window is mapped to a specified point in the output area and presented at the specified scale. Any picture data that goes outside the output area is trimmed at the area boundary.

Bytes 12–13: X-offset
  The 'x' displacement of the graphic block origin from the area origin in L units of the area. This parameter must be provided if the mapping option is X'30 and the origin of the block is different from the origin of the area.

GOC bytes 14–15: Y-offset
  The 'y' displacement of the graphic block origin from the area origin in L units of the area. This parameter must be provided if the mapping option is X'30' and the origin of the block is different from the origin of the area.

All area mapping operations, except Scale-to-Fit, are windowing operations on the data when the object presentation space goes beyond the boundary of the area.

This can result in a perceived loss of information to an end user. If this result is not desirable, then positioning of the data should be done via the object positioning control only; the area mapping options should not be used.

It should be further noted, however, that the trim never occurs in area mapping operations where the object space rectangle lies entirely within the output area.

Graphic Data Descriptor

The Graphic Data Descriptor (GDD) is a required data structure field in the Write Graphics Control command. It specifies the parameters that define the input picture boundaries in Graphic Presentation Space and set the drawing default conditions.

GDD byte 4: Graphics Unit of Measure

X'00' indicates the graphics GVS unit of measure is inches; X'01' indicates the unit base is centimeters.

GDD bytes 1-2: L Units/unit-base

Bytes 5-6 contain a binary parameter expressing the number of graphic GVS units per unit-base used in specifying distances in the picture. L (GVS) units are the same in X and Y. That is, all distance measurements are based on a uniform X Y cartesian coordinate system.

The valid range for L (GVS) on a base of inches is any integer divisor or multiplier of 1440. The required range for L (GVS) is any integer divisor of 1440 including 1440.

GDD bytes 7-14: GPS Window

A sequence of four two-byte limit values that define the region of interest within the picture data. This is the data that is to be mapped and presented in the output area on the page.

The X and Y limit values must define a rectangle (view window) that is parallel to the X Y axes of the GVS coordinate space. The order in which limits are specified is shown below.

Bytes 5-6: X Left Limit
   Bytes 7-8: X Right Limit
   Bytes 9-10: Y Top Limit
   Bytes 11-12: Y Bottom Limit GDD bytes 15-16: Graphics Flags These bytes contain information flags that characterize the data within the graphic object.

This portion of the Graphic Data Descriptor structure field contains zero or more self-describing instructions that set the drawing defaults for the picture. The general format is described first, followed by the format for each unique attribute set.

SET CURRENT DEFAULTS DRAWING DEFAULT 'SELF-DESCRIBING FIELD'

| BYTE | BIT | CONTENT | MEANING |
|---|---|---|---|
| 0 | | X'21' | SET CURRENT DEFAULTS Instruction code |
| 1 | | X'4' or LENGTH | Length of following data (= X'4' if setting to Standard Values) |
| 2 | | SET | |
| | | X'00' | Drawing Attributes |
| | | X'01' | Line Attributes |
| | | X'02' | Character Attributes |
| | | X'03' | Marker Attributes |
| | | X'04' | Pattern Attributes |
| | | X'05' | Viewing Window (Ignored by DR1, DR2 Printers) |
| | | X'06' | Reserved |
| | | X'07' | Viewing Transform (Ignored by DR1, DR2 Printers) |
| | | X'08' | Coordinate Type |

SET CURRENT DEFAULTS DRAWING DEFAULT 'SELF-DESCRIBING FIELD' -continued

| BYTE | BIT | CONTENT | MEANING |
|---|---|---|---|
| | | X'09' | Reserved |
| | | X'0A' | Reserved |
| | | X'0B' | Arc Parameters |
| | | X'0C' to X'FF' | Reserved or not applicable to Printers |
| 3-4 | | MASK | Set Mask |
| 5 | | DEFAULT | |
| | | X'0F' | Set all indicated items to their Standard Default values |
| | | or | |
| | | X'8F' | Set the indicated items to the values contained in the Immediate data |
| 6-N | | DATA | Immediate data Bytes 6 onwards are not present if Byte 5 - X'0F' |

This instruction allows the setting of a variable number of values, under control of MASK (in bytes 3-4), into the default set indicated by the value of SET (in byte 2).

Bits 0-15 in Mask correspond to items within the indicated set.

A '1' in any bit of MASK indicates that the corresponding item is to be set. If the DEFAULT byte is X'0F', then these items are set to the standard defaults; if it is X'8F', then these items are set to the values contained in the data. A '0' in any bit in MASK indicates the corresponding item is not changed.

The data is contained in bytes 6 onwards of the Instruction.

Write Graphics

The Write Graphics command transmits graphic data to the printer. The data that is carried in this command consists of picture segments that in turn contain the drawing orders that define the picture in graphic presentation space.

The segments that are sent to the printer are of two types: 'chained' or 'unchained'. The type is indicated by the property flags.

The chained segments are the picture. The unchained segments are assumed to be segments that are called by drawing orders within the picture, although they might not actually be called.

All segments sent to the printer are executed in immediate mode as defined by the GAD. That is the drawing orders are executed as they are received (except for unchained segments) are are not retained or stored as named segments. The receipt of the first 'Chained segment' is an implicit command to the printer to start the drawing process. Chaining field information, if any, in the Segment introducer is ignored in immediate mode execution.

There are no restrictions on how much or how little data is sent to the printer in a single Write Graphics command, except for the 32K length limit of the command. A Write Graphic command, for example, can transmit partial segments, full segments, multiple segments, or any combination of these. The only requirement is that the data itself is ordered in the sequence that is expected for immediate execution.

The Begin Segment format is shown in the following diagram. A value of "X" indicates that the contents of the field are ignored by printers.

| BYTE | BIT | CONTENT | MEANING |
|------|-----|---------|---------|
| 0 | — | X'70' | Begin Segment Command |
| 1 | — | X'0C' | Length of following parameters |
| 2-5 | — | XXXX | Name of this Segment (ignored by DR2 or lower printers) |
| 6 | | | |
| | 0 | B'0' | Visible |
| | 1 | B'X' | Do Not Propagate Invisibility |
| | 2 | B'X' | Not Pickable |
| | 3 | B'X' | Do Not Propagate Pickability |
| | 4 | B'X' | Do Not Highlight |
| | 5 | B'X' | Do Not Propagate Highlightability |
| | 6 | B'X' | Not Dynamic |
| | 7 | B'X' | Reserved |
| 7 | 0 | B'0' | Chained |
| | | B'1' | Unchained |
| | 1-2 | B'XX' | Chain Flags (ignored - "immediate mode" execution) |
| | 3 | B'X' | Prologue Flag (ignored - "immediate mode" execution) |
| | 4 | B'X' | Reserved for Users use |
| | 5-6 | REP/APPEND | |
| | | B'00' | New segment |
| | | B'10' | Replace existing Segment |
| | | B'11' | Append the data to end of Segment (Continuation of previous Segment in "immediate mode" execution) |
| | 7 | DATA FLAG | |
| | | B'0' | Data in SEGDATA |
| 8-9 | | SEGLEN | Length of Segment to be created (a zero length is invalid) |
| 10-13 | | XXXX | Predecessor/successor name is included (ignored) |
| 14-N | | SEGDATA | Segment Data. The number of bytes is equal to SEGLEN |

BAR CODE FUNCTION SET

Write Bar Code Control

The Write Bar Code Control command is sent to the printer to indicate that the command sequence that follows is directed to a bar code presentation block area on the current page, overlay or page segment that is being constructed by the device. The parameters of this command define the size, placement and orientation of the bar code block and establish the initial conditions for interpreting the bar code data.

A bar code block contains one or more bar code symbols with or without human readable interpretation of the bar-encoded information. However, in most applications the interpretation is desirable.

Because an important application of bar code printing is to print bar code symbols on labels, means is provided in the function set to repeat symbols with a reduced overhead. The repeated symbols must be of the same type, but may or may not have the same length and/or content of variable data. General parameters applying to all of the repeated symbols are carried in a single Write Bar Code Control command. Parameters that always change or can change from symbol to symbol are included, with the variable data to be bar-encoded, in the Write Bar Code command of which there is a separate one for each symbol printed.

Upon receiving the Write Bar Code Control command, the printer enters the appropriate bar code block state, then initializes control for processing bar code symbols that are sent in subsequent Write Bar Code commands. The End command received in bar code block state, terminates the processing of bar code data.

Positive acknowledgement of bar code block commands in Overlay State or Page Segment State means that general syntax and validity checks have been made and the command, or command sequence, has been accepted for processing. Exception conditions that are detected when the data is included on the page are reported asynchronously, when exception reporting is enabled.

The Write Bar Code Control data is made up of three consecutive structured fields: Bar Code Area Position Control (BCAPC), Bar Code Output Control (BCOC) and Bar Code Data Descriptor (BCDD). The format of this command is:

The first five bytes ("WBCC LL", "WBCC ID", "Flags") are the standard process command header.

"BCAP LL" is the two byte length of the Bar Code Area Position control portion of this command's data.

"BCAP ID" is the two byte identifier of the Bar Code Area Position structured field.

"BCOC LL" is the two byte length of the Bar Code Output Control portion of this command's data.

"BCOC ID" is the two byte identifier of the Bar Code Output Control structured field.

"BCDD LL" is the two byte length of the Bar Code Data Descriptor portion of this command's data.

"BCDD ID" is the two byte identifier of the Bar Code Data Descriptor structured field.

Bar Code Area Position (BCAP)

This data structured field defines the position and orientation of the Bar Code Object Area relative to a Reference coordinate system. It is a required data field in the Write Bar Code Control command.

BCAP bytes 4-7: Object Area Origin
   Two two-byte binary numbers that specify the position of the top left corner of the bar code output area. These numbers represent either an X,Y or I,B coordinate position depending on the value specified in byte 10, Reference System, below. All values of X and Y or I and B are permitted.

BCAP bytes 8-9: Object Area Orientation
   This parameter specifies the orientation of the bar code output area, i.e., the X axis of the bar code block) in terms of an angle measured clockwise from the X or I axis of the reference coordinate system. The effect of this parameter is to rotate the output space defined for the area around the origin position specified in bytes 4-7 above. Bar Code symbols presented in the area are aligned such that the positive x-axis of the symbol is parallel to, and in the same direction as, the positive X axis of the area.

The Output Area Orientation is specified using the same syntax as that used for specifying the Inline Sequence Direction for text, however, this parameter is independent of the text orientation. The acceptable values in degrees are: 0 (X'0000'), 90 (X'2D00'), 180 (X'5A00'), and 270 (X'8700').

BCAP byte 10: Reference System

This parameter defines the reference coordinate system used to position the output area on the page. The valid values are:

X'00' = Text (absolute I, absolute B),
X'20' = Text (absolute I, relative B),
X'40' = Text (relative I, absolute B),
X'60' = Text (relative I, relative B), and
X'80' = Page (absolute X, absolute Y).

Bar Code Output Control (BCOC)

This data structured field specifies the mapping option for the bar code object. It is an elective data field in the Write Bar Code Control command, i.e.:

It is omitted if block and area are congruent.
If block origin is different from area origin, then this field must be present.

If this field is omitted, the offset of the block origin with respect to the area origin must be zero on each axis, and the extent of the area and block is to be found in Bytes 10-13 of the Bar Code Data Descriptor field.

BCOC byte 4: Area Unit of Measure
  X'00' indicates the unit-base for x and y dimensions is inches; X'01' indicates the unit base is centimeters.

BCOC bytes 5-6: L Units/unit-base
  BCOC bytes 5-6 contain a binary parameter expressing the number of units per unit base used in specifying distances in the area X or Y direction. For example, if the unit base is X'00' and this value is 1440, then L units—1440 units per inch.

BCOC bytes 7-8: X-Extent of Area
  The X dimension (width) of the area in L-units. The valid range is 1 to 32,767. This is the length of the X axis of the output area. If the Bar Code Output Control field is omitted, the area extent is as specified in bytes 10-13 of the Bar Code Data Descriptor field.

BCOC bytes 9-10: Y-Extent of Area
  The Y dimension (height) of the area in L-units. The valid range is 1 to 32,767. This is the length of the Y axis of the output area. If the Bar Code Output Control field is omitted, the area extent is as specified in bytes 10-13 of the Bar Code Data Descriptor field.

BCOC byte 11: Object Mapping Flag
  The coding X'30' indicates that the block origin is offset from the area origin, and that the upper left hand corner of the block is mapped to a specified point in the output area. The four bytes that follow specify the offset from the area reference point or origin, to the block reference point or origin.

BCOC bytes 12-13: X-offset
  This is used when the block origin does not coincide with the area origin. It is defined as the 'x' displacement of the block origin from the area origin in 'L' units. The block X-extent in this case is specified in Bytes 10-11 of the Bar Code Data Descriptor structured field.

BCOC bytes 14-15: Y-offset
  This is used when the block origin does not coincide with the area origin. It is defined as the "y" displacement of the block origin from the area origin in "L" units. The block Y-extent in this case is specified in Bytes 12-13 of the Bar Code Data Descriptor structured field.

Bar Code Data Descriptor (BCDD)

This is a required data structured field in the Write Bar Code Control command. It defines the block measurement parameters, the bar code to be used, the bar code variation if applicable, and various other size parameters and attributes of the bar code symbol(s) contained in the bar code block.

BCDD byte 4: Xp Unit of Measure
  X'00' indicates the base unit of measure for the Xp dimension of the bar code block is inches; X'01' indicates the base unit is centimeters.

BCDD byte 5: Yp Unit of Measure
  X'00' indicates the base unit of measure for the Yp dimension of the bar code block is inches; X'01' indicates the base unit is centimeters. Yp units must equal Xp units.

BCDD bytes 6-7: Xp L Units/unit-base
  Bytes 6-7 contain a binary parameter expressing the number of units per unit-base used in specifying the Xp-extent of the bar code block. For example, if the base is X'00' and this parameter is 1440, then L units = 1440 units per inch.

BCDD bytes 8-9: Yp L Units/unit-base
  Bytes 8-9 contain a binary parameter expressing the number of units per unit-base used in specifying the Yp-extent of the bar code block. Yp L units must be the same as Xp L units.

BCDD bytes 10-11: Xp-Extent of Bar Code Block—Presentation Space
  The Xp dimension (width) of the bar code block in Xp L units. The valid range is 1 to 32,767. This is the length of the X axis of the block.
  If a symbol reference point falls outside the bar code block presentation space, an exception condition exists.
  If it is attempted to print any HRI character or symbol feature outside the block, an exception condition exists.

BCDD bytes 12-13: Yp-Extent of Bar Code Block—Presentation Space
  The Yp dimension (height) of the bar code block in YP 1 units. The valid range is 1 to 32767. This is the length of the Y axis of the block.
  See description of bytes 10-11 above for exception conditions.

BCDD bytes 14-15: Bar Code Flags
  These bytes contain information flags that characterize the data within the bar code object.

BCDD byte 16: Bar Code Type
  The kind or name of the bar code (including version if applicable) to be printed.

| Code Point | Assignments — Bar Code Type |
|---|---|
| X'00' | Reserved |
| X'01' | MHI/AIM USD-3 (3 of 9 code) |
| X'02' | MSI |
| X'03' | UPC-Version A |
| X'04' | UPC-Version D |
| X'05' | UPC-Version E |
| X'06' | UPC-Magazine and paperback, two digit |
| X'07' | UPC-Magazine and paperback, five digit |
| X'08' | EAN-8 |
| X'09' | EAN-13 |
| X'0A' | 2 of 5 - Industrial |
| X'0B' | 2 of 5 - Matrix |

-continued

| Code Point | Assignments Bar Code Type |
|---|---|
| X'0C' | MHI/AIM USD-1, 2 of 5 Interleaved |
| X'0D' | MHI/AIM USD-4, Code-a-bar, 2 of 7 |
| X'0E' | JAN-Short |
| X'0F' | JAN-Standard |
| X'10' | MHI/AIM USD-2, Subset of 3 of 9 code |
| X'11' | MHI/AIM USD-6, Code 128 |
| X'12' | MHI/AIM USD-7, Code 93 - Does not include ASCII |
| X'13' | MHI/AIM USD-8, Code 11 |
| X'14' | ASCII Version, MHI/AIM USD-7, Code 93 |
| X'15' | Plessey |
| X'16' | EAN Two Digit Add-on |
| X'17' | EAN Five Digit Add-on |
| X'18' to X'FF' | Reserved |

BCDD byte 17: Modifier
  A one byte hexadecimal that has various meanings depending on the bar code type.
BCDD byte 18: LCID
  Local identifier of the coded font to be used when HRI is specified. It is the same as the operand byte of the Write Text "2B" Set Coded Font Local command.
BCDD bytes 19-20: Color
  Two byte identifier of the color to be used when presenting the bar code symbol.
BCDD byte 21: Unit/Module Width
  Width in thousandths of an inch (mils) of the smallest defined dimension for the bar code being printed. The widths of all symbol elements are normally expressed as multiples (not necessarily integer multiples) of the unit/module width. (1 mil=1.44 "L" units when L=inch/1440; i.e., multiply mils by 1.44 to get "L" units.)
  If the printer cannot print the specified width, an exception condition exists.
BCDD bytes 22-23: Element height
  Height in "L" units of the symbol bar/space elements. For the UPC/EAN/JAN family only, it is the total symbol height which includes both bar/space patterns and HRI. X'FF' means use device default height.
BCDD byte 24: Height Multiplier
  This is a binary indication of the number of vertically contiguous identical bar/space patterns that will be printed in a symbol. Default is device dependent and may be a smaller integer number within the capability of the device, or 1.
BCDD bytes 25-26: Wide/Narrow Ratio
  Ratio of wide element dimension to narrow element dimension when there are only two different size elements. The ratio is usually not an integer, but a decimal fraction, and typically varies between 2.00 and 3.00.
  These bytes will be the binary representation of a two or three decimal digit number. A decimal point is assumed to follow the first significant decimal digit.
  The Wide/Narrow ratio is not applicable to all bar codes, e.g., the UPC family.
  If the printer does not have the ability to print the specified narrow or wide element width, an exception exists. Device default widths are used. Default "wide" widths and specified or default unit/module width, whichever used, should be such that a wide/narrow ratio of 2.25 to 3.00 results.
  X'FF'—Used when wide/narrow ratio is not applicable.

Write Bar Code

The Write Bar Code command pertains to one individual bar code symbol. It contains parameters that locate the symbol reference point within the bar code block.

A "flags" byte contains information as to whether or not a human readable interpretation (HRI) is to be printed, whether the HRI is to be above or below the bar/space patterns, and for the 3 of 9 code, whether the HRI of the start/stop character (a star or asterisk) is to be printed or not.

One Write Bar Code Control command can apply to many successive and contiguous Write Bar Code commands. A new Write Bar Code Control command is required under the following circumstances:
  The type or version of the bar code symbols is changed.
  A new bar code block is started.
The Write Bar Code command is made up of a single structured field. The format of this command is:
The first five bytes ("WBC LL", "WBC ID", "Flags") are the standard process command header.
The "data" is separately described in the remainder of the section. It gives the location(s) of the symbol reference point(s) and contains the variable data to be bar-encoded and printed, and, if specified, to be printed in human readable form.
One or more Write Bar Code command structured fields is required with each Write Bar Code Control command
Bytes 0-1: Length of Field
  A binary count of the number of bytes, including the length bytes themselves, in this structured field.
Bytes 2-3: Write Bar Code Command ID
  A two-byte identifier that this structured field is a Write Bar Code command.
Byte 4: Flags (Bit 0 is high order bit)
  Bit 0: Human Readable Interpretation
    "0"—HRI to be printed
    "1"—No HRI
  Bits 1-2: HRI Location
    "00"—Printer's option
    "01"—Below symbol
    "10"—Above symbol
    "11"—Reserved (Ignore)
      NOTE: When printing UPC family symbols, these bits are to be ignored and the symbol specification followed.
  Bit 3: Start/Stop HRI for 3 of 9 Code (Asterisk)
    "0"—Do not print the HRI for the start and stop bar/space patterns of the 3 of 9 code.
    "1"—Print the HRI for the 3 of 9 code start/stop bar/space patterns.
  Bits 4-7: Reserved (Ignore)
Bytes 5-6: X-coordinate of Symbol Reference Point (See Notes 1 through 3 below).

X-coordinate of top left corner of symbol, referenced to block origin. These bytes are required in every WBC command.

Notes:
1. The dimensions in the in-line direction between symbol reference points, for successive Write Bar Code commands covered by the same Write Bar Code Control command, are intended to include both left and right quiet zones plus all bar/space patterns and other defined symbol features, and a reasonable separation between symbols.
2. The dimensions in the b direction between symbol reference points, for successive Write Bar Code commands covered by the same Write Bar Code Control command, are intended to include height of the bar/space elements, the height of the HRI character box (if HRI is specified), the required separation between bar/space elements and HRI, and a reasonable separation between symbols.
3. If the symbol reference point is outside the bar code block presentation space, an exception condition exists.

Bytes 7–8: Y-coordinate of Symbol Reference Point (See Notes 1–3 above).

Y-coordinate of top left corner of symbol, referenced to block origin. These bytes are required in every WBC command.

Bytes 9–n: Variable Data

It is the variable data to be bar-encoded and, if required, interpreted. For some codes, one or more initial bytes may describe a symbol parameter, e.g., the number system in the UPC code.

If it is attempted to print any HRI character or symbol feature outside the bar code block presentation space, an exception condition exists.

PAGE SEGMENT FUNCTION SET

Begin Page Segment

This command defines a segment of page data which is not to be printed at this time but is to be saved within the printer. This page segment is to be included later via an Include Page Segment command.

The definition of the page segment is terminated by an End Page command. The page segment itself is contained between the Begin Page Segment and the End Page commands. Any intervening Anystate commands are processed as they are received and are not saved as part of the page segment. The page segment may not contain any Include commands, such as including an overlay or another page segment.

The Begin Page Segment command transmits two bytes of data to the printer.

Bytes 0–1: Page Segment Identifier

A two-byte binary number which identifies the page segment. Support for values from 1 to 127 is required.

It is an error if this number specifies a page segment identifier that is already loaded in the printer.

Delete Page Segment

This command causes either a single page segment or all page segments to be deleted. Identification numbers of deleted page segments are available for immediate reuse by the host system.

Completed buffered sheets will be printed and stacked before this command is executed.

An exception may exist if any incomplete buffered sheet, i.e., one side of a duplex sheet, requires all or part of the page segment(s) to be deleted. This exception need not necessarily be detected or reported synchronously with this command.

The Delete Page Segment command transmits two bytes of data to the printer.

Bytes 0–1: Page Segment Identifier or "delete all" indicator.

A two-byte binary number which identifies the page segment to be deleted or specifies the deletion of all page segments. Support for values from 0 to 127 is required.

Nonzero values identify an individual page segment to be deleted and corresponds to the identifier on a Begin Page Segment command. An exception exists if the page segment specified is not currently defined.

A value of X'0000' indicates delete all page segments.

Include Page Segment

This command causes a previously stored set of commands to be processed in the input stream as though they were just received from the host.

Following the inclusion of a page segment, the current print position (Ic,Bc) is where it was set by the page segment processing.

The Include Page Segment command transmits two bytes of data to the printer.

Bytes 0–1: Page Segment Identifier

A two-byte binary number which identifies the page segment to be included. Support for values from 1 to 127 is required.

This value corresponds to the identifier on a Begin Page Segment command. An exception exists if the page segment specified is not defined.

OVERLAY FUNCTION SET

Begin Overlay

The Begin Overlay command defines data which is not to be printed at this time but is to be saved within the printer as an overlay.

An overlay may contain the same information and is built in the same way as a logical page. The key distinction between these two data constructs is that overlays are stored while logical pages are printed. The overlay definition is terminated by an End Page command. Any intervening Anystate commands are processed as they are received and are not saved as part of the overlay.

A stored overlay is later merged with ordinary printed pages either via the Include Overlay command or by the Load Copy Control command.

An overlay definition may contain zero or more Include Overlay or Include Page Segment commands. Such included objects must be present in the printer when finally included on a page. The depth of included overlay nesting is limited only by the available memory space within the printer.

The current Load Page Description, Load Font Equivalences, and Load Equivalence records, if any, become part of the definition of the overlay.

The Begin Overlay command transmits 1 byte of data.

Byte 0: Overlay Identifier

A one-byte number which identifies the overlay. Support for values from 1 to 254 is required.

It is an exception if this parameter specifies an overlay identifier already loaded in the printer.

Delete Overlay

This command causes either a single overlay or ALL page overlays to be deleted.

When overlays are deleted, they are no longer available for merging. Identification numbers of deleted overlays are available for immediate reuse by the host system.

Completed buffered sheets will be printed and stacked before this command is executed.

An exception may exist if any incomplete buffered sheet, i.e., one side of a duplex sheet, requires all or part of the overlay(s) to be deleted. This exception need not necessarily be detected or reported synchronously with this command.

Byte 0: Overlay Identifier or "delete all" indicator
- A one-byte binary number which identifies the overlay to be deleted or specifies the deletion of ALL overlays. Support for values from 1 to 254 is required.
- Nonzero values identify an individual overlay to be deleted and correspond to the identifier on a Begin Overlay command. An exception exists if the overlay specified is not currently defined.
- A value of X'0000' indicates delete all overlays.

Include Overlay

The Include Overlay command causes a previously stored overlay to be merged onto the current page. The logical page reference corner of the overlay is positioned (via bytes 3–5 and 7–9, below) relative to the X,Y coordinates of its containing logical page coordinate system, using the L-unit definitions in effect at the time the Include Overlay command is received.

Following the inclusion (and processing) of an overlay, the current print position (Ic,Bc) remains where it was prior to the overlay processing. All page description values, font and suppression equivalences, and text control values are restored to the values which existed for each at the time the Include Overlay was processed.

The Include Overlay command transmits 10 bytes of data as shown below, to the printer.

Bytes 0–1: Overlay Identifier
- A two-byte binary number which identifies the overlay to be included. Support for values from 1 to 254 is required.
- This value corresponds to the identifier specified on the Begin Overlay command. It is an exception if the overlay specified by this parameter is not defined.

Byte 2: Reserved

Bytes 3–5: X-Coordinate
- A three-byte parameter which is the X-coordinate offset, in L-units, of the logical page reference corner of the overlay relative to the logical page reference corner of its immediately containing logical page or overlay.
- The value may range from minus 32,768 to plus 32,767. A value of X'FFFFFF' defaults this co-ordinate to the current inline coordinate (Ic).

Byte 6: Reserved

Bytes 7–9: Y-Coordinate
- A three-byte parameter which is the Y-coordinate offset, in L-units, of the logical page reference corner of the overlay relative to the logical page reference corner of the base logical page.
- The value may range from minus 32,768 to plus 32,767. A value of X'FFFFFF' defaults this co-ordinate to the current baseline coordinate (Bc).

CHANNEL ENVIRONMENT

This section describes the use of the process by channel attached printers. It applies the normal protocols of a channel to communicate information to and from host programs and the printer hardware. The IBM MVS operating system is used as an example to describe the supporting software structure.

The table below illustrates the relevant host software interface layers and their function. Existing printer application software such as the Print Services Facility (PSF), the Overlay Generation Language (OGL), the Document Composition Facility (DCF), and the Graphical Display Data Manager (GDDM) are used as examples to convey the layered structure. Note the lack of intermediate network layers.

| Application | OGL, DCF, GDDM, etc.: user interface CPDS, MODCA, PTOCA |
|---|---|
| Presentation | PSF: generate process data stream Packaged process Commands |
| Data Link | IOS, ERP: drive channel Channel Commands |
| Physical | Channel cable Channel Tag Sequence |

All process commands to the printer are packaged as ordinary channel data. Both the presentation and data link layer generate channel commands to the printer depending on their function.

Channel Commands

As noted above, process commands from the host system to the printer consist of five fields: command length, command code, flags, command correlation number, and data. Process commands are independent of the channel commands used to transmit them to the printer. Two channel commands are defined for the exchange of data between host presentation software and the printer. Process commands are packaged within these channel commands.

The actual presentation channel commands accepted by the printer are as follows:

Presentation Channel Commands:
- Write (X'01'): Transmits all process commands from the host system to the printer for processing. The process permits multiple process commands to be packaged within a single channel command and also permits process commands to span channel commands. The Write channel command is only accepted by the printer when it is Ready.
- Read (X'02'): Transmits the process Acknowledge Reply from the printer to the host system. It is accepted by the printer whether it is Ready or Not Ready.

The usual Data Link software within the operating system is responsible for driving the channel program. It communicates with the printer using four channel commands.

Data Link Channel Commands accepted by the printer are as follows:

No Op: Performs no operation.

Test IO: Tests the IO path and control unit.

Sense IO: Transmits sense data from the printer to the host system.

Sense ID: Transmits identification data from the printer to the host system.

Ready/Not Ready

Data Link software monitors the Ready/Not Ready state of the printer. The printer indicates a Not Ready to Ready transition in the normal manner for S/370 channel-attached devices: it posts an unsolicited Device End. It indicates a Ready to Not Ready transition by position Unit Check status and presenting sense data specifying that it is Not Ready.

Acknowledge Protocol

The acknowledge protocol governs the transmission of the process Acknowledge Reply from the printer to presentation software via the Read channel command.

The Read channel command may be issued at any time and must be issued to clear a pending acknowledge reply. An acknowledge reply is pending whenever presentation software sets the ARQ flag bit in a process command or the printer posts a NAK as described below. Write command data received when an acknowledge reply is pending is ignored by the printer. A Read channel command issued when no acknowledge reply is pending causes the return of a zero positive acknowledgement.

A Read channel command always terminates the Write command stream in progress. That is, the following Write channel command contains the start of a new process command.

Data Link channel commands are accepted and processed by the printer at any time without affecting this protocol.

Printer Error Reporting

All printer-detected conditions reported to presentation software are reported as NAKs. This includes all Command Reject, Data Check, and Specification Check errors as well as some Intervention Required and Equipment Check conditions. NAKs are reported to the host system with a Unit Check at Initial Selection. Data Link software distinguishes these conditions from other Unit Check conditions that need not be reported to presentation software, e.g., operator STOP, by examining printer sense data. When presentation software receives a NAK, it should issue a Read channel command per the acknowledge protocol. The printer will not post another NAK until the first NAK has been cleared.

Errors in the data stream are indicated as Command Reject, Data Check, or Specification Check and do not change the Ready/Not Ready state of the printer. Such errors are reported as soon as they are encountered by the printer. The negative acknowledge reply that specifies such an error typically includes the correlation number of the command in error; commands following the one in error are ignored. The indication of Device End status following a channel command does not imply that the process commands within that channel command have been inspected for errors; it merely specifies that another channel command may be accepted by the printer. The host system requests synchronization with the printer via the ARQ flag in each process command. Both positive and negative process Acknowledge Replies are returned via the Read Channel command. The rules governing the process Acknowledge protocol are previously described.

Device errors and conditions are indicated as Intervention Required or Equipment Check and cause the printer to become Not Ready. Sense data specifies whether the condition is confined to data line software or is a NAK that must be reported to presentation software. While Not Ready, the printer does not accept the Write channel command.

SNA ENVIRONMENT UNDER LU-1

This section describes the use of the process with Systems Network Architecture (SNA) protocol with a Logical Unit (LU-1) implementation for interfacing communication lines.

When an SNA device elects to support the process, the half session must support:

The process data stream.

Selection of the process as the active data stream using the Data Stream Profile (DSP) and Destination Selection (DSSEL) fields of a Function Management Header Type 1 using Subset Type 4.

Indication of support of the process data stream is via the Data Stream Query Reply with the data stream identifier=X'02'.

Within SNA Logical Unit Type 1, half sessions may exchange process data using Function Management Header (FMH) type 1/Subset Type 4. Setting the Data Stream Profile (DSP) to process commands when the Destination Selection (DSSEL) field is Begin Destination Selection (BDS) establishes the process as the data stream governing the flow of data for the duration of that destination selection.

The beginning and the ending FMH 1 must be sent Only-In-Chain (OIC). This means that the beginning FMH 1 (DSP-IPCS, DSSEL=BDS) is sent in the first chain, the process data follows in one or more chains, and the ending FMH 1 (DSP=IPCS, DSSEL-EDS) is sent in the last chain. Note that no data may be sent in the first or the last chain.

The begin and end destination selection represents document boundaries for process documents. At the start of process document boundaries, i.e., BDS, the format parameters are set to their process default values.

Under LU-1, the default data stream is the SCS Base Data Stream with extensions as specified in the BIND request and the Device Characteristics Query Reply structured field. Therefore, when a session is started or the process data stream is terminated when the process destination is ended, SCS becomes the active data stream.

The following is the FMH 1 format for introducing the process data stream:

| BYTE | BIT | CONTENT | NAME |
|------|-----|---------|------|
| 0 | — | X'06' | Length of header |
| 1 | 0 | B'0' | FMHC |
|   | 1-7 | B'0000001' | Type 1 |
| 2 | 0-3 | X'3' | SEL medium |
|   | 4-7 | X'0' | Logical address |
| 3 | 0 | B'0' | SRI-requests |
|   | 1 | B'0' | Demand SEL |
|   | 2-3 | B'00' | Reserved |
|   | 4-7 | X'D' | DSP SEL=IPCS |
| 4 | 0-2 | B'010' | BDS (begin IPCS) |
|   |     | B'001' | EDS (end IPCS) |
|   | 3 | B'0' | DST |
|   | 4 | B'0' | Reserved |

| BYTE | BIT | CONTENT | NAME |
|------|-----|---------|------|
|      | 5   | B'0'    | CMI - no compression |
|      | 6   | B'0'    | CPI - no compaction |
|      | 7   | B'0'    | Reserved |
| 5    | —   | X'00'   | Reserved |

To send process data to the host, the following procedure is followed. The SLU-1 (secondary logical unit) will interpret CD (change direction) as a request for PA key input except when the CD occurs in a chain containing a host request for input. If a CD without a host request for input is received and PA key input is not already pending, the SLU-1 will sound the printer audible alarm to alert the operator. A wait will then occur until either:

Operator presses a PA key.
PLU (primary logical unit) sends a signal (request CD).
PLU terminates the session.
Printer times-out.

When a PA key is pressed, the PA key input is sent with CD.

If a CD without a host request for input is received and PA key input is already pending, the PA key is sent with CD.

If the situation occurs where a host request for input (with CD) is received when a PA key is pending or an exception condition occurred where IPCS input is required, the SLU-1 will stack the PA key input and send in the IPCS input. The PA key input is sent when a CD is received (without a host request for input) and no other input is pending.

3270 Data Stream Non-SNA Environment

When a device elects to support the process in the 3270 Data Stream non-SNA environment, the device must support the following functions:

The process data stream.
Selection of the process as the active data stream using the Select Process Mode Structured Field.
Indication of support of the process data stream via the 3270 process Query Reply.
The Data Chaining Structured Field which provides for the 3270 Data Stream an analogy of the concept of chaining as defined in SNA.
Indication of support of data chaining via the Data Chaining Query Reply.

In the 3270 Data Stream (DS) environment, the addition of the process creates another data stream mode in addition to the 3270 mode of operation. The two modes of operation are mutually exclusive. Structured fields defined in the process will generally be rejected when the machine is in the 3270 mode of operation and vice versa. More specifically, the device will endeavor to interpret the commands/orders in the received data stream in accordance with the process it understands. This, of course, may lead to unpredictable results in certain cases.

When in process mode, the definition of printer characteristics and the exception handling functions defined by the process will be used.

The default mode is the 3270 Data Stream. Use of the printer for local copy printing is restricted to the 3270 mode. A change of mode will clear the printer buffers of any data associated with the predecessor mode. The printer must maintain forms synchronization across modes as is currently done between the 3270 and the SCS data streams.

Data Chaining

Structured field "grouping" allows the relating of a number of structured fields to a single "logical" entity. Grouping applies only to certain structured fields. Those structured fields which may be grouped must have a group parameter in Bits 1 and 2 of the first flag byte. The definition of the group parameters is:

B'00' = Continue
B'01' = End
B'10' = Begin
B'11' = Only

Data chaining is a unique application of structured field grouping, the use of which is limited to the data chain structured field.

The SNA protocols provide a chaining function which allows a long message to be divided into small transmissions to match the capability of a device. The division can be done without regard to control sequence or structured field boundaries. Non-SNA protocols do not provide this type of function. However, a "chaining like" function is provided by the use of the structured field grouping function by the data chain structured field.

The data chaining function allows the grouping of structured fields of different types, including structured fields which do not support the group parameter. The data chaining is provided by the data chain structured field which uses the group parameter to provide the chaining control. The data to be sent, which must be in structured field form, can be divided without regard to structured field or control sequence boundaries, into a number of transmissions of a size to accommodate the device capability.

A Write Structured Field (WSF) and a data chain structured field are added at the start of each transmission. The length value (X'06') of the data chain structured field covers just the data chain structured field. It does not include the rest of the data in the transmission.

The data chain structured field in the first transmission has the group parameter = "Begin". In the next through the penultimate transmission, the group parameter = "Continue". In the last transmission, the group parameter = "End". In the first transmission, a structured field must start immediately following the data chain structured field. However, in subsequent transmissions, this is not necessarily so. The data following may be a continuation of a structured field started in a previous transmission. That is, the length count of a structured field may span transmissions. If the length count of a structured field is not satisfied at the end of a transmission (excluding the last transmission of a data chain), the remainder of the data to satisfy the count starts immediately after the data chain structured field in the next transmission. The length count of a structured field could, in some cases, carry across a number of transmissions.

Selecting Process Mode

The structured field shown below is used to select process mode when the process is supported in the 3270 non-SNA environment.

| BYTE | BIT | CONTENT | MEANING |
|------|-----|---------|---------|
| 0-1  | —   | X'06'   | Length of this structured field |

-continued

| BYTE | BIT | CONTENT | MEANING |
|---|---|---|---|
| 2-3 | — | X'0F83' | Select process mode |
| 4-5 | — | — | Reserved, must be zeros |

3270 Process Query Reply

This query reply indicates support of the process via the 3270 Data Stream (non-SNA).

| BYTE | BIT | CONTENT | MEANING |
|---|---|---|---|
| 0-1 | — | X'08' | Length of this structured field |
| 2 | — | X'81' | Query reply descriptor |
| 3 | — | X'9A' | 3270 process descriptor |
| 4-5 | — | Flags | Reserved, must be zeros |
| 6-7 | — | Tranlim | Maximum transmission size allowed outbound |

Data Chain Structured Field

This structured field is used to provide a "data chaining" capability for non-SNA environments.

| BYTE | BIT | CONTENT | MEANING |
|---|---|---|---|
| 0-1 | — | X'06' | Length of this structured field |
| 2-3 | — | X'0F21' | Data chain descriptor |
| 4 | 0 | Reserved | Must be zero |
| | 1-2 | Group | B'00' = Continue<br>B'01' = Begin<br>B'10' = End<br>B'11' = Only |
| | 3-7 | Reserved | Must be zero |
| 5 | — | Flags | Reserved, must be zeros |

Data Chaining Query Reply

This query reply indicates that data chaining is supported.

| BYTE | BIT | CONTENT | MEANING |
|---|---|---|---|
| 0-1 | — | X'06' | Length of this structured field |
| 2 | — | X'81' | Query reply descriptor |
| 3 | — | X'97' | Data chaining descriptor |
| 4 | 0-1 | Dir | Indicates direction supported<br>B'00' = Both<br>B'01' = From device only<br>B'10' = To device only<br>B'11' = Reserved |
| | 2-7 | Reserved | Must be zero |
| 5 | — | Flags | Reserved, must be zeros |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A process for interconnecting an all points addressable page printer with a host application program, said application presenting output to be printed to said printer, wherein said host application can be present on a variety of different computing equipment such as a large host computer, a standalone workstation, or a workstation on a local area network, and wherein said all points addressable page pringer can utilize any type of printing technology such as electrophotographic, magnetic, ion deposition, ink jet, or impact, wherein said printer and said application are interconnected by a communicating means such as a channel, local area network, or telecommunication lines, and wherein any type of transmission protocol can be used, wherein said process enables the transmission of commands and data from said host application to said printer independent of the type of communication means and transmission protocol, and wherein said process enables the transmission of a variety of types of data including text, graphics, image or bar code which may be merged together on a single printed page, comprising the steps of:

entering said process into a first state condition to enable said application to issue device control commands which are independent of the type of printing technology being used and provide data for controlling basic device operations and to enable the construction of logical pages, a logical page being a boundaried area not necessarily equal in size to a physical printed page, said device control commands and data both being packaged within the data field of the communications protocol used between said application and said printer so that the device control commands and data are independent of the type of communication means and transmission protocol;

entering said process into a second state to enable said application to issue presentation control commands which are independent of the type of printing technology being used and provide data for controlling the presentation of data on a logical page, said presentation control commands being packaged within the data field of the communication protocol used between said application and said printer so that the presentation control commands and data are independent of the type of communication means and transmission protocol; and providing response acknowledgement data from said printer to said application in either said first state or said second state by utilizing the data field of the communication protocol to transmit said response from said printer to said application so that said response is independent of the type of communication means and transmission protocol.

2. The process of claim 1 wherein said second state of said process includes a page state in which presentation text data is transmitted from said application to said printer.

3. The process of claim 2 wherein said page state enables the transmission of text data to a logical page presentation space or to a block presentation space, a block being a boundaried portion of a logical page.

4. The process of claim 1 wherein said second state of said process includes a page state in which presentation image data is transmitted from said application to said printer.

5. The process of claim 4 in which said page state enables the transmission of image data to a block presentation space, a block being a boundaried portion of a logical page.

6. The process of claim 1 wherein said second state of said process includes a page state in which presentation graphics data is transmitted from said application to said printer.

7. The process of claim 6 wherein said page state enables the transmission of graphics data to a block presentation space, a block being a boundaried portion of a logical page.

8. The process of claim 1 wherein said second state of said process includes a page state in which presentation bar code data is transmitted from said application to said printer.

9. The process of claim 8 wherein said page state enables the transmission of bar code data to a block presentation space, a block being a boundaried portion of a logical page.

10. The process of claim 1 wherein said second state of said process includes a page state in which presentation data can be textual data or image data transmitted from said application to said printer.

11. The process of claim 10 wherein said page state enables the transmission of text data to a logical page presentation space, and transmission of image data to an image block presentation space, a block being a boundaried portion of a logical page, upon which logical page said text data and said image block data are merged.

12. The process of claim 10 wherein said page state enables the transmission of text data to a text block presentation space, a block being a boundaried portion of a logical page, and enables the transmission of image data to an image block presentation space, said text block and said image block boundaries being wholly or partially overlapped to merge data types if commanded by the application.

13. The process of claim 1 wherein said second state of said process includes a page state in which presentation data can be textual data or image data or graphics data transmitted from said application to said printer.

14. The process of claim 13 wherein said page state enables the transmission of text data to a logical page presentation space, transmission of image data to an image block presentation space, a block being a boundaried portion of a logical page, and transmission of graphics data to a graphics block presentation space, upon which said text data, said image block data, and/or said graphics block data are merged.

15. The process of claim 13 wherein said page state enables the transmission of text data to a text block presentation space, a block being a boundaried portion of a logical page, enables the transmission of image data to an image block presentation space, and enables the transmission of graphics data to a graphics block presentation space, said text block, said image block and/or said graphics block boundaries being wholly or partially overlapped to merge data types if commanded by the application.

16. The process of claim 1 wherein said second state of said process includes a page state in which presentation data can be textual data, image data, graphics data or bar code data transmitted from said application to said printer.

17. The process of claim 16 wherein said page state enables the transmission of text data to a logical page presentation space, transmission of image data to an image block presentation space, a block being a boundaried portion of a logical page, transmission of graphics data to a graphics block presentation space, and transmission of bar code data to a bar code block presentation space, upon which said text data, said image block data, said graphics block data, and/or said bar code block data are merged.

18. The process of claim 16 wherein said page state enables the transmission of text data to a text block presentation space, a block being a boundaried portion of a logical page, enables the transmission of image data to an image block presentation space, enables the transmission of graphics data to a graphics block presentation space, and enables the transmission of bar code data to a bar code block presentation space, said text block, said image block, said graphics block and/or said bar code block boundaries being wholly or partially overlapped to merge data types if commanded by the application.

19. The process of claim 1 wherein said second state of said process includes an overlay state in which presentation text data is transmitted from said application to said printer.

20. The process of claim 19 wherein said overlay state enables the transmission of text data to an overlay presentation space, said overlay being stored by said printer after it is constructed for future incorporation into a logical page to be printed.

21. The process of claim 20 wherein said overlay state enables the transmission of text data to a text overlay block presentation space, overlay block being a boundaried portion of said overlay presentation space.

22. The process of claim 21 wherein said second state of said process includes a page state in which a command is transmitted from said application to said printer to cause said overlay to be included on a logical page to be printed.

23. The process of claim 20 wherein said second state of said process includes a page state in which a command is transmitted from said application to said printer to cause said overlay to be included on a logical page to be printed.

24. The process of claim 1 wherein said second state of said process includes an overlay state in which presentation image data is transmitted from said application to said printer.

25. The process of claim 24 wherein said overlay state enables the transmission of image data to an overlay presentation space, said overlay being stored by said printer after it is constructed for future incorporation into a logical page to be printed.

26. The process of claim 25 wherein said second state of said process includes a page state in which a command is transmitted from said application to said printer to cause said overlay to be included on a logical page to be printed.

27. The process of claim 1 wherein said second state of said process includes an overlay state in which presentation graphics data is transmitted from said application to said printer.

28. The process of claim 27 wherein said overlay state enables the transmission of graphics data to an overlay presentation space, said overlay being stored by said printer after it is constructed for future incorporation into a logical page to be printed.

29. The process of claim 28 wherein said second state of said process includes a page state in which a command is transmitted from said application to said printer to cause said overlay to be included on a logical page to be printed.

30. The process of claim 1 wherein said second state of said process includes an overlay state in which presentation bar code data is transmitted from said application to said printer.

31. The process of claim 30 wherein said overlay state enables the transmission of bar code data to an overlay presentation space, said overlay being stored by said printer after it is constructed for future incorporation into a logical page to be printed.

32. The process of claim 31 wherein said second state of said process includes a page state in which a command is transmitted from said application to said printer to cause said overlay to be included on a logical page to be printed.

33. The process of claim 1 wherein said second state of said process includes an overlay state in which presentation text data or image data is transmitted from said application to said printer.

34. The process of claim 33 wherein said overlay state enables the transmission of text data or image data to an overlay presentation space, said overlay being stored by said printer after it is constructed for future incorporation into a logical page to be printed.

35. The process of claim 34 wherein said overlay state enables the transmission of text data to a text overlay block presentation space, overlay block being a boundaried portion of said overlay presentation space, enables the transmission of image data to an image overlay block presentation space, said text overlay block and said image overlay block boundaries being wholly or partially overlapped if commanded by said application.

36. The process of claim 34 wherein said second state of said process includes a page state in which a command is transmitted from said application to said printer to cause said overlay to be included on a logical page to be printed.

37. The process of claim 35 wherein said second state of said process includes a page state in which a command is transmitted from said application to said printer to cause said overlay to be included on a logical page to be printed.

38. The process of claim 1 wherein said second state of said process includes an overlay state in which presentation text data or image data or graphics data is transmitted from said application to said printer.

39. The process of claim 38 wherein said overlay state enables the transmission of text data or image data or graphics data to an overlay presentation space, said overlay being stored by said printer after it is constructed for future incorporation into a logical page to be printed.

40. The process of claim 39 wherein said overlay state enables the transmission of text data to a text overlay block presentation space, overlay block being a boundaried portion of said overlay presentation space, enables the transmission of image data to an image overlay block presentation space, enables the transmission of graphics data to a graphics overlay block presentation space, said text overlay block and said image overlay block and/or said graphics overlay block boundaries being wholly or partially overlapped if commanded by said application.

41. The process of claim 40 wherein said second state of said process includes a page state in which a command is transmitted from said application to said printer to cause said overlay to be included on a logical page to be printed.

42. The process of claim 39 wherein said overlay state enables the transmission of text data to a text overlay block presentation space, overlay block being a boundaried portion of said overlay presentation space, enables the transmission of image data to an image overlay block presentation space, enables the transmission of graphics data to a graphics overlay block presentation space, enables the transmission of bar code data to a bar code overlay block presentation space, said text overlay block and said image overlay block and said graphics overlay block and/or said bar code overlay block boundaries being wholly or partially overlapped if commanded by said application.

43. The process of claim 42 wherein said second state of said process includes a page state in which a command is transmitted from said application to said printer to cause said overlay to be included on a logical page to be printed.

44. The process of claim 39 wherein said second state of said process includes a page state in which a command is transmitted from said application to said printer to cause said overlay to be included on a logical page to be printed.

45. The process of claim 1 wherein said second state of said process includes an overlay state in which presentation text data or image data or graphics data or bar code data is transmitted from said application to said printer.

46. The process of claim 45 wherein said overlay state enables the transmission of text data or image data or graphics data or bar code data to an overlay presentation space, said overlay being stored by said printer after it is constructed for future incorporation into a logical page to be printed.

47. The process of claim 46 wherein said second state of said process includes a page state in which a command is transmitted from said application to said printer to cause said overlay to be included on a logical page to be printed.

48. The process of claim 1 wherein said first state enables said printer to respond to said host application to identify the printer type and model and the data type or types, i.e., text, graphics, image and/or bar code, for which the printer supports the reception of presentation control commands and data together with any limitations on such support.

49. The process of claim 48 wherein said first state enables said printer to respond to said application to identify printer resources resident in printer memory, i.e., fonts, page segments and overlays.

50. The process of claim 49 wherein said first state enables said application to establish logical page parameters.

51. The process of claim 50 wherein said first state enables said application to establish the location of logical pages on physical pages.

52. The process of claim 51 wherein said first state enables the application to specify the number of prints to be produced, simplex or duplex, overlays to be used, page segments to be used, and suppression of data in certain page portions to simulate "spot" carbons.

53. The process of claim 1 wherein a structured field format is used for all commands and acknowledge replies, said commands and replies packaged within the data field of the communication protocol, said structured field format providing command information within the first five or seven bytes and data information beginning with the sixth or eighth byte, said command information including the command length in the first two bytes, the command identifier in the third and fourth bytes, the command flag information in the fifth byte, and an optional command correlation number in the sixth and seventh bytes, said data information beginning at the sixth byte if there is no optional command correlation number and beginning at the eighth byte if there is a command correlation number, the presence or absence of a command correlation number being indicated by a bit in the command flag byte.

54. The process of claim 53 wherein said data information includes text data, image data, graphics data, bar code data or device control data.

* * * * *